United States Patent
Hakata et al.

(10) Patent No.: US 9,225,893 B2
(45) Date of Patent: Dec. 29, 2015

(54) INFORMATION DISPLAY DEVICE AND DISPLAY DRIVING METHOD

(75) Inventors: Masayuki Hakata, Saitama (JP); Yasutake Kawashima, Saitama (JP)

(73) Assignee: Optoelectronics Co., Ltd., Saitama (JP)

( * ) Notice: Subject to any disclaimer, the term of this patent is extended or adjusted under 35 U.S.C. 154(b) by 165 days.

(21) Appl. No.: 13/977,504

(22) PCT Filed: Dec. 26, 2011

(86) PCT No.: PCT/JP2011/079999
§ 371 (c)(1), (2), (4) Date: Aug. 29, 2013

(87) PCT Pub. No.: WO2012/090898
PCT Pub. Date: Jul. 5, 2012

(65) Prior Publication Data
US 2013/0329123 A1 Dec. 12, 2013

(30) Foreign Application Priority Data
Dec. 28, 2010 (JP) ................... 2010-294156

(51) Int. Cl.
*G02F 1/13* (2006.01)
*H04N 5/232* (2006.01)
(Continued)

(52) U.S. Cl.
CPC .............. *H04N 5/23212* (2013.01); *G02B 7/09* (2013.01); *G02F 1/1313* (2013.01); *G03B 13/16* (2013.01);
(Continued)

(58) Field of Classification Search
CPC ... H04N 5/23212; H04N 5/232; G03B 13/16; G02F 1/13471
See application file for complete search history.

(56) References Cited

U.S. PATENT DOCUMENTS 7,567,337 B2 * 7/2009 Horiuchi ........... G02F 1/133382
349/20
7,852,454 B2 * 12/2010 Border ..................... G02B 7/08
349/200

(Continued)

FOREIGN PATENT DOCUMENTS

JP     H02110428 A    4/1990
JP     2001-222011 A    8/2001
(Continued)

OTHER PUBLICATIONS

"Related International Patent Application No. PCT/JP2011/079999 International Search Report", Jan. 18, 2012, Publisher: JPO, Published in: JP.

Primary Examiner — Ahmed A Berhan
(74) Attorney, Agent, or Firm — Brundidge & Stanger, P.C.

(57) ABSTRACT

A liquid crystal lens optical body that is available to a rapid response, the liquid crystal lens optical body having a first liquid crystal lens in which a liquid crystal layer is held between first electrodes, the first liquid crystal lens changing optical power by controlling orientation condition of liquid crystal molecules based on an input signal to the electrodes, and a second liquid crystal lens in which a liquid crystal layer is held between second electrodes, the second liquid crystal lens changing optical power by controlling orientation condition of liquid crystal molecules based on the input signal to the electrodes, the first and second liquid crystal lenses provided on an optical axis. In each liquid crystal lens, a response characteristic when the optical power undergoes a transition from a large condition thereof to a small condition thereof is different from a response characteristic when the optical power undergoes a transition from a small condition thereof to a large condition thereof.

8 Claims, 19 Drawing Sheets

(51) Int. Cl.
*G02B 7/09* (2006.01)
*G02F 1/29* (2006.01)
*G02F 1/1347* (2006.01)
*G03B 13/16* (2006.01)

(52) U.S. Cl.
CPC .............. *H04N 5/232* (2013.01); *G02F 1/1347* (2013.01); *G02F 2001/291* (2013.01); *G02F 2001/294* (2013.01); *G02F 2203/28* (2013.01)

(56) References Cited

U.S. PATENT DOCUMENTS

2002/0160126 A1    10/2002  Toko et al.
2006/0215107 A1*    9/2006  Horiuchi et al. .............. 349/200
2010/0039532 A1*    2/2010  Galstian ............... H04N 5/2254
                                                        348/231.99
2010/0073623 A1*    3/2010  Border et al. ................. 349/200

FOREIGN PATENT DOCUMENTS

| | | |
|---|---|---|
| JP | 2002-056348 A | 2/2002 |
| JP | 2005-182117 A | 7/2005 |
| JP | 2006-197393 A | 7/2006 |
| JP | 2006-227036 A | 8/2006 |
| JP | 2008-233628 A | 10/2008 |
| JP | 2010-286740 A | 12/2010 |
| JP | 2011_034360 B1 | 2/2011 |
| WO | 2010143662 A1 | 12/2010 |
| WO | WO 2010143662 A1 * | 12/2010 |

* cited by examiner

INFORMATION DISPLAY DEVICE AND DISPLAY DRIVING METHOD

TECHNICAL FIELD

The present invention relates to a liquid crystal lens optical body which has a variable focal length function and an optical-information-reading apparatus which is provided with this liquid crystal lens optical body and has an object to principally read a code symbol such as a barcode and a two-dimensional code or an image of a scene or an article.

BACKGROUND

The bar code, which is one-dimensional code information as a purpose of merchandise management, inventory management or the like, and the two-dimensional code as a code having any higher information density have been known. A method has been known such that the code information is imaged by a solid-state image sensing device such as CMOS image sensor and CCD image sensor, as a device for imaging the two-dimensional code, various kinds of processing are performed on an image thereof, and it is binarized and decoded.

The CMOS image sensor used in such an apparatus which reads the code information has not been different from the one equipped for a digital camera or the like in a function so that it is required to have also a function as a camera to normally take photographs of an object and/or a scene. For example, in a case of the inventory management, it is used in a case where a target article and a location in which the article is stored are imaged, which are stored in a database together with any code information.

A small-scaled camera using the above-mentioned CMOS image sensor is equipped for a mobile phone. The camera function of the most of mobile phones includes a scanner for barcode/two-dimensional code and an optical character reader (OCR) other than that of taking a photograph of a scene or a person like the normal digital cameras. Namely, a digital camera, which is provided with any code-symbol-photographing-and-decoding function, has been widely needed (see, for example, Patent Document 1).

Further, in a field of the above-mentioned merchandise management, inventory management or the like, it is necessary to scan code symbols applied to articles one after another. In this moment, it is desirable to equip with an autofocus function, and the autofocus function and an imaging process are required to be fast.

Generally, a method is considerably used such that lens is arranged so as to move along an optical axis thereof, a distance on which it is in focus on the code symbol is calculated, and the lens moves up to a position that is suitable for the distance (see, for example, Patent Document 2). Further, a simple autofocus is considerably used such that two lens locations of short and long ranges, in addition to a fixed lens location, are stored in a memory and when failing to image, the lens moves to a direction of the short range or the long range (see, for example, Patent Document 3).

Additionally, as a more efficient method, a method using a liquid lens has been realized (see, for example, Patent Document 4). The liquid lens is configured so as to contain water solution having high conductivity and oily fluid having insulation in a container through which light is permeable. The water solution and the oily fluid are not mixed and have a boundary surface. Electrodes are provided at both ends of the container and by applying voltage on the electrodes, it is possible to change a shape of the boundary surface between the water solution and the oily fluid from a flat shape to a convex or concave shape using electro-wetting phenomenon.

Such an operation enables a flexural rate of the lens to alter to implement any focus control. It is called as varifocal lens because the focus control is implemented in the lens, not driving the lens mechanically.

The varifocal lens is very suitable for an apparatus such as a cord scanner or a mobile phone, in which an imaging function area is small, because any mechanically driving area is not necessary.

PRIOR ART DOCUMENTS

Patent Documents

Patent Document 1: Japanese Patent Application Publication No. 2006-197393.
Patent Document 2: Japanese Patent Application Publication No. 2002-56348.
Patent Document 3: Japanese Patent Application Publication No. 2005-182117.
Patent Document 4: Japanese Patent No. 4473337.

SUMMARY

The varifocal lens is suitable for a camera portion of a code scanner or a mobile phone because of its mechanical driving focus mechanism. To realize any higher accurate imaging, however, plural liquid lenses or solid lenses are to be used so that smaller lens mechanism is required in a small-sized code scanner or a mobile phone. Further, in a code scanner which performs a large amount of data processing, a response speed of the liquid lens is not always satisfied.

Thus, the present invention is to provide a liquid crystal lens optical body which is capable of keeping a rapid response and an optical-information-reading apparatus which is provided with a small sized autofocus mechanism that can perform the imaging with high accuracy, can keep the rapid response so that it may correspond to the large amount data processing and can be set up in a smaller area, in a code scanner or a camera.

In order to solve the above-mentioned problems, the present invention is a liquid crystal lens optical body comprising plural liquid crystal lenses on an optical axis thereof, each liquid crystal lens including a liquid crystal layer and electrodes holding the liquid crystal layer therebetween and changing optical power by controlling orientation condition of liquid crystal molecules based on an input signal to the electrodes, wherein in the plural liquid crystal lenses, a response characteristic when the optical power undergoes a transition from a large condition thereof to a small condition thereof, in response to the input signal, is different from a response characteristic when the optical power undergoes a transition from a small condition thereof to a large condition thereof.

Further, this invention is an optical-information-reading apparatus comprising a varifocal lens that adjusts a focal position, an imaging means that images an object focused by the varifocal lens, a distance-measuring means that measures a distance to the object to be imaged, and a control means that calculates the distance up to the object using the distance-measuring means, controls the varifocal lens based on calculated distance information to focus the object with the imaging means and images the object, wherein the varifocal lens contains plural liquid crystal lenses on an optical axis thereof, each liquid crystal lens including a liquid crystal layer and electrodes holding the liquid crystal layer therebetween and changing optical power by controlling orientation condition of liquid crystal molecules based on an input signal to the electrodes, and wherein in the plural liquid crystal lenses, a response characteristic when the optical power undergoes a transition from a large condition thereof to a small condition thereof, in response to the input signal, is different from a response characteristic when the optical power undergoes a transition from a small condition thereof to a large condition thereof.

In this invention, an autofocus operation to be focused is performed at a response of any of the respective liquid crystal lenses in which a transition of the optical power is rapid in response to the input signal.

According to the present invention, it is possible to downsize the whole of the lens mechanism by using the liquid crystal lenses as the varifocal lens. Further, by using the liquid crystal lenses, it is possible to perform any imaging with high accuracy in which the focusing accuracy is excellent without any orientation of the imaging. Since a transition in which a response speed is rapid is selected in a combination of the plural liquid crystal lenses, a fast focus control can be attained.

DETAILED DESCRIPTION

The following will describe embodiments of a liquid crystal lens optical body and an optical-information-reading apparatus according to the present invention with reference to drawings.

<Configuration Example of Optical-Information-Reading Apparatus According to this Embodiment>

Figure 1:
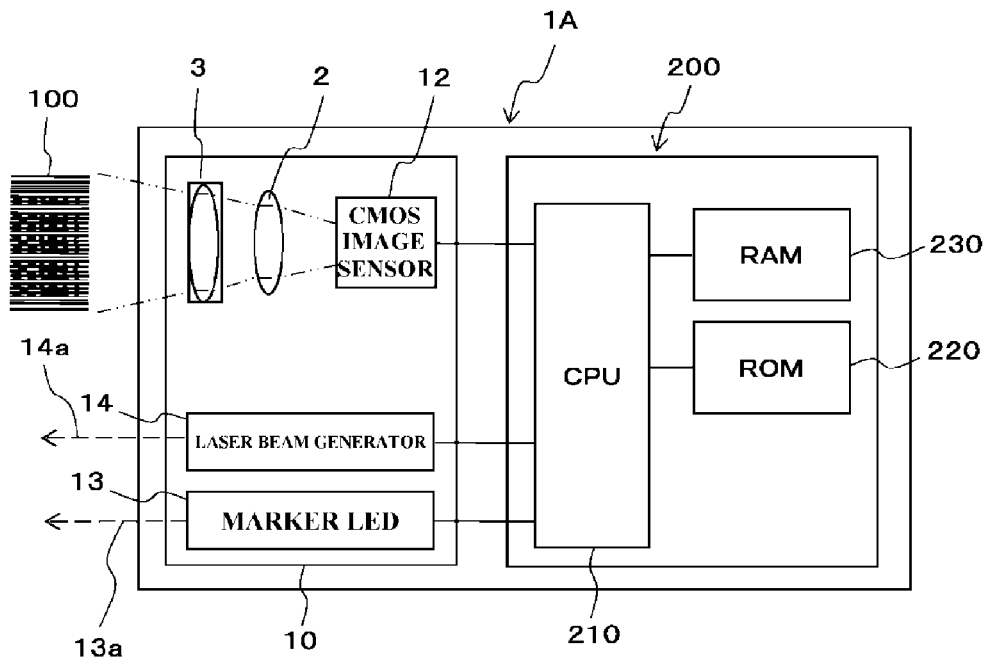
FIG. 1 is a functional block diagram showing an example of an optical-information-reading apparatus according to this embodiment.

FIG. 1 is a functional block diagram showing an example of an optical-information-reading apparatus according to this embodiment. The optical-information-reading apparatus 1A according to this embodiment is provided with an optical portion 10 that images a code symbol 100, which is an object to be read, and a decoder 200 that controls the imaging, a focus adjustment, decoding, a data transfer or the like, which are performed in the optical portion 10. The optical-information-reading apparatus 1A is referred to as a cord scanner and has such a configuration that any components such as the optical portion 10 and the decoder 200 and the like are installed in, for example, a case, not shown, and a user can image the code symbol 100 with him having it by his hands.

The optical portion 10 is a module which detects the code symbol 100, which is an object to be read, irradiates a laser beam to the object to be read to detect reflected light therefrom in order to measure a distance up to the object to be read and images the object to be read including the code symbol 100. The optical portion 10 is provided with a master lens 2, a varifocal lens 3, a complementary metal oxide semiconductor (CMOS) image sensor 12, a marker light emitting diode (LED) 13 and a laser beam generator 14.

The master lens 2 and the varifocal lens 3 are a group of lenses for focusing the light reflected from the object to be read including the code symbol 100 on the CMOS image sensor 12. The light thus reflected includes the reflected light of a laser beam irradiated from the laser beam generator 14 and the reflected light of an illumination light irradiated from the marker LED 13.

As the master lens 2, a lens made of glass or plastic materials is used in this embodiment. Further, as the varifocal lens 3, the liquid crystal lenses which can adjust its focal length based on the applied voltage is used. Details of the liquid crystal lenses will be described later.

The CMOS image sensor 12 is an example of imaging means and images an image of the object to be read by detecting the light that is incident thereon through the varifocal lens 3 and the master lens 2 using image sensors and outputting a detection signal from each of the image sensors as digital image data to the decoder 200.

The marker LED 13 is an example of illuminating means and irradiates the illumination light 13a to the object to be read under the control from the decoder 200 to illuminate it. The irradiation of the illumination light 13a is executed by irradiating a pulse light synchronized with an imaging frame of the CMOS image sensor 12 and by adjusting a period of illuminating time, it is possible to adjust an amount of electric charge which is stored in each photodiode of the CMOS image sensor 12 by the light reflected from the object to be read during a period of imaging time of one frame. In other words, when setting a period of illumination time so as to be long, the image which the CMOS image sensor 12 obtains by imaging it becomes bright but when setting it so as to be short, the image becomes dark.

The laser beam generator 14 is an example of a laser outputting means and outputs a laser beam 14a using for the detection of the code symbol 100, which is the object to be read, and using for the measurement of distance up to the object to be read. The laser beam generator 14 is arranged at a position and an angle such that if the object to be read exists within a position where the optical-information-reading apparatus 1A can read the code symbol 100, the light reflected from the object to be read can be incident to the CMOS image sensor 12.

When using a visible light as the laser beam, a spot by the laser beam can be recognized visually so that the laser beam can be used not only as the measurement of distance but also as an alignment of the code symbol 100 with reading region of the optical-information-reading apparatus 1A. Further, when using an invisible light, the spot by the laser beam cannot be recognized visually so that those around it do not feel uncomfortable even when switching pulse light. Accordingly, it is possible to configure the optical-information-reading apparatus 1A so that while the laser beam is set so as to always switch the pulse light, it is capable of starting the reading rapidly without any action and/or operation for switching the laser beam.

Additionally, it is conceivable to output any of two species of laser beams by changing them automatically or manually under circumstances using any 2-wavelength laser beam generator which can output visible and invisible laser beams.

Next, the decoder 200 will be described. The decoder 200 is provided with a CPU 210, an ROM 220 that stores a program and a table which the CPU 210 performs and an RAM 230 using as a working space to be used when the CPU 210 performs various kinds of processing.

As the CPU 21, for example, an application specific integrated circuit (ASIC) may be used. Further, as the ROM 220, any flush ROM (FROM) may be used and as the RAM 230, a synchronous dynamic random access memory (SDRAM) may be used.

The CPU 210 performs the program stored in the ROM 220 to control the operation of the whole of the optical-information-reading apparatus 1A using the RAM 230 as the working space and performs any processing that is necessary for the detection of the object to be read, the measurement of distance up to the object to be read, any control of the alignment of focus based on the obtained distance, the decode of the code symbol 100, the output to the outside or storage of the result of decoding and the like.

<Configuration Example of CMOS Image Sensor>

Figure 2:
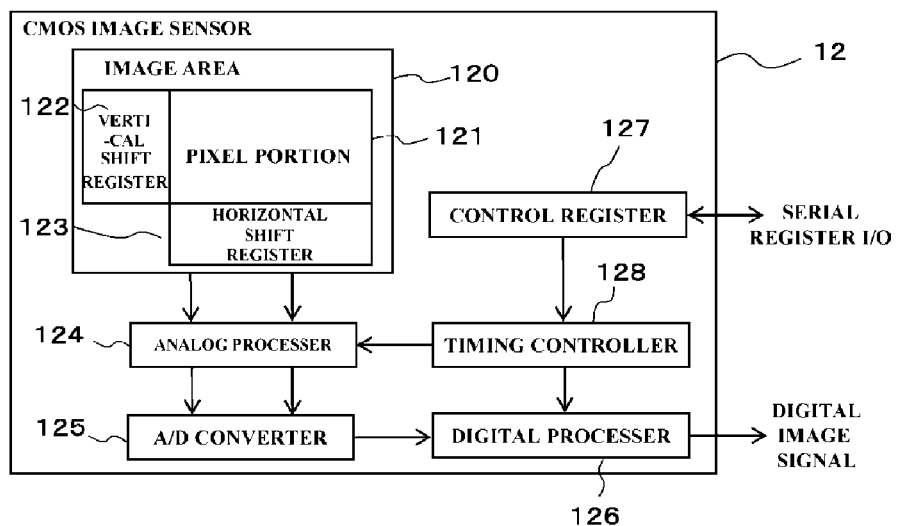
FIG. 2 is a functional block diagram showing an example of CMOS image sensor.

FIG. 2 is a functional block diagram showing an example of the CMOS image sensor and the following will describe the CMOS image sensor 12 in detail with reference to FIG. 2. In an image area 120 provided in the CMOS image sensor 12, plural pixels are formed like a matrix in which each pixel of a pixel portion 121 has a photo diode, a flouting diffusion (FD) region, a transfer transistor for allowing any electric charge to be transferred from the photodiode to the FD region and a reset transistor for resetting the FD region to a predetermined electric potential.

In the image area 120, a vertical shift register 122 that controls a vertical signal is arranged at a side of the pixel matrix in which the pixels are formed like a matrix and a horizontal shift register 123 that controls a horizontal signal is arranged under the pixel matrix.

The vertical shift register 122 and the horizontal shift register 123 are analog circuits that generate voltages which are necessary for driving the pixels. Signals from the vertical shift register 122 and the horizontal shift register 123 are output to the outside through an analog processor 124, an A/D converter 125 and a digital processor 126 successively.

Further, the analog processor 124 includes any functions such as voltage amplification and gain control and performs a predetermined analog signal processing. The A/D converter 125 converts an analog image signal from the analog processor 124 to a digital image signal. The digital processor 126 includes any functions such as noise cancelling and data compression and performs a digital processing on the digital image signal from the A/D converter 125 to output the processed digital image signal to the outside.

A control register 127 allows inputting/outputting the signal from/to the outside and allows a timing controller 128 to meet clock timing of the analog processor 124 and the digital processor 126 to output the signals from each pixel of the pixel portion 121 at a predetermined order as image data.

Further, in the CMOS image sensor 12, a global shutter is adopted in which a start and stop of the storage of electric charge based on an amount of received light on each pixel are controlled at almost the same time on all the pixels. Accordingly, it is provided with plural comparators each of which compares a value corresponding to the electric charge stored in each pixel with a common reference value, terminals for outputting a logical sum signal of these output signals, and the like. When at least one of the outputs of the plural comparators in the pixel portion 121 indicates that the stored electric charge exceeds the reference value, the global shutter is controlled to stop the storage of electric charge in each pixel.

<Configuration Example of Liquid Crystal Lens Optical Body According to this Embodiment>

Figure 3:
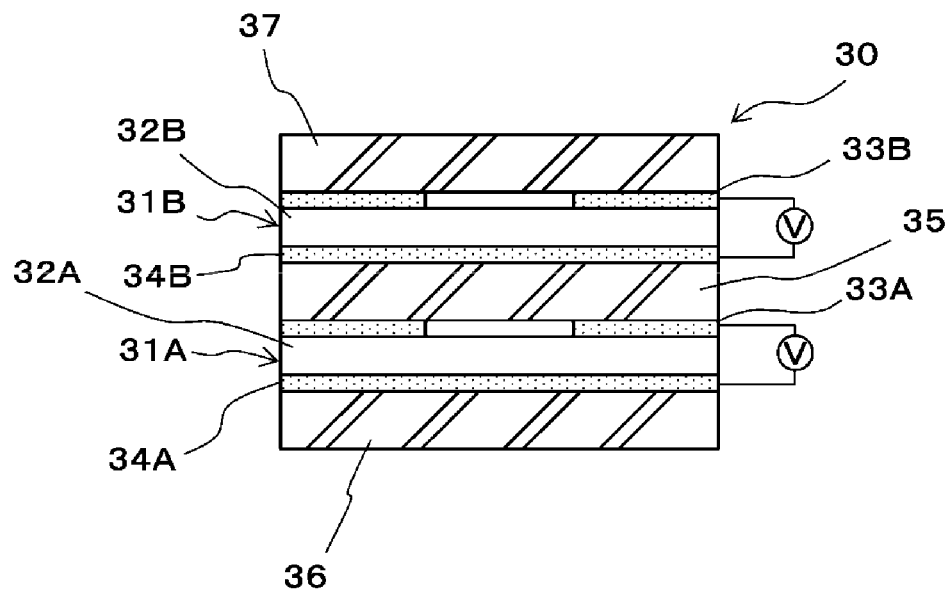
FIG. 3 is a configuration diagram of a liquid crystal lens optical body showing an example thereof.

FIG. 3 is a configuration diagram of a liquid crystal lens optical body showing an example thereof, according to an embodiment of varifocal lens. The following will describe the liquid crystal lens optical body in detail according to this embodiment.

The liquid crystal lens optical body 30 according to this embodiment is composed of plural layers of liquid crystal lenses, in this embodiment, two layers of liquid crystal lenses of a first liquid crystal lens 31A and a second liquid crystal lens 31B. The first liquid crystal lens 31A and the second liquid crystal lens 31B are arranged on an optical axis thereof. The first liquid crystal lens 31A is configured so that a liquid crystal layer 32A is held between an electrode 33A and an electrode 34A. The second liquid crystal lens 31B is configured so that a liquid crystal layer 32B is held between an electrode 33B and an electrode 34B. Each of the electrodes 33A, 33B, 34A and 34B is made of any transparent materials of Indium Tin Oxide (ITO).

The first liquid crystal lens 31A and the second liquid crystal lens 31B are laminated through glass 35 inserted therebetween. Further, the first liquid crystal lens 31A and the second liquid crystal lens 31B are held between glass 36 and glass 37.

In the first liquid crystal lens 31A and the second liquid crystal lens 31B, the voltages are separately controlled so that a voltage is applied to the electrode 33A and the electrode 34A in the first liquid crystal lens 31A and a voltage is applied to the electrode 33B and the electrode 34B in the second liquid crystal lens 31B.

In the liquid crystal lens, by utilizing an electro-optical effect in the liquid crystal, an orientation state of liquid crystal molecule alters according to a variation of the voltage applied to the electrodes so that a refractive index (optical power) of a lens may alter continuously. Thus, the liquid crystal lens optical body 30 has an autofocus function in which a focal length alters by adjusting the voltage. In this embodiment, since two layers of liquid crystal lenses are used, the optical power of each lens may be separately controlled and it is possible to execute such a control that one is positive optical power and the other is negative optical power.

<Rapid Responsiveness of Liquid Crystal Lens>

The following will describe a configuration by which a responsiveness of the liquid crystal lens is improved. The liquid crystal lens optical body 30 is configured to have a combination of the plural liquid crystal lenses in which a response characteristic when the optical power undergoes a transition from a large condition thereof to a small condition thereof in response to an input signal, in this embodiment, an input voltage, is different from a response characteristic when the optical power undergoes a transition from a small condition thereof to a large condition thereof.

In the liquid crystal lens, a response speed when the optical power undergoes a transition to the large condition thereof is generally different from a response speed when the optical power undergoes a transition to the small condition thereof so that periods of time until an amount of the transition reaches a target one in relation to the input voltage are different from each other in a direction where the optical power becomes larger and a direction where the optical power becomes smaller.

Thus, in this embodiment, the liquid crystal lens optical body 30 is configured to be a combination of the first liquid crystal lens 31A and the second liquid crystal lens 31B which have a reverse relationship between the response characteristic when the optical power undergoes a transition from a large condition thereof to a small condition thereof in response to the input voltage and the response characteristic when the optical power undergoes a transition from a small condition thereof to a large condition thereof.

Figure 4A:
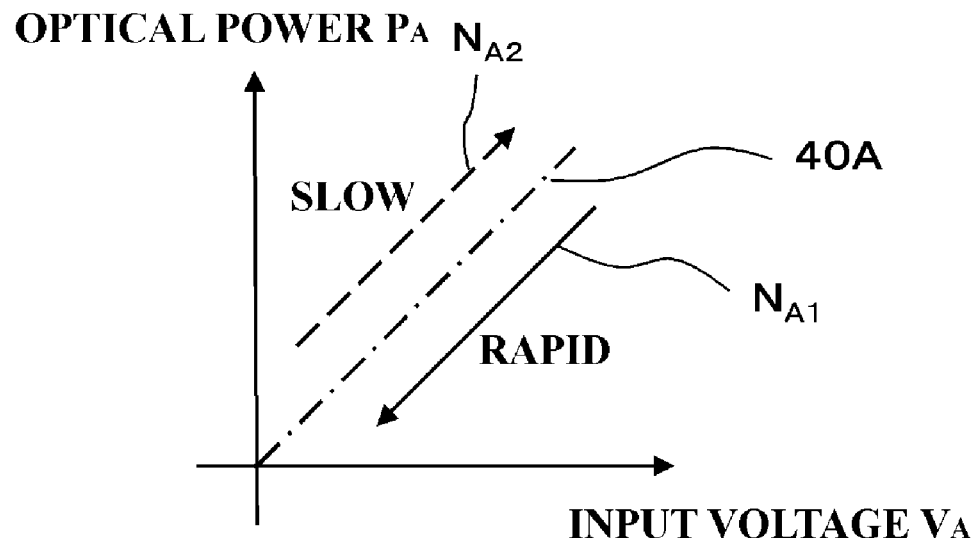
FIG. 4A is a graph showing a relationship between an input voltage and a transition of optical power.
Figure 4B:
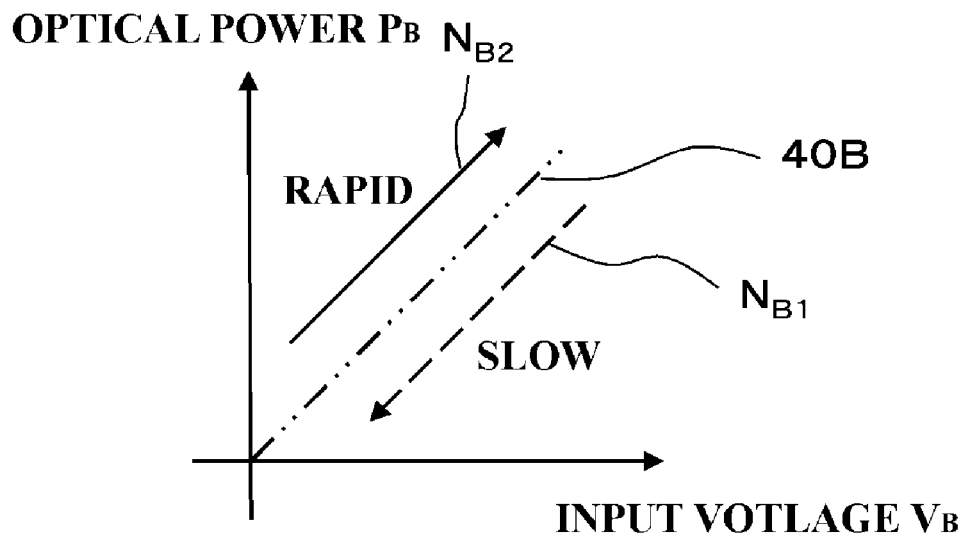
FIG. 4B is a graph showing a relationship between an input voltage and a transition of optical power.

FIGS. 4A and 4B are graphs each showing a relationship between an input voltage and a transition of the optical power. FIG. 4A indicates the response characteristic of the first liquid crystal lens 31A and FIG. 4B indicates the response characteristic of the second liquid crystal lens 31B. In the following embodiments, it is assumed that when increasing the input voltage, the optical power undergoes a transition to a large condition thereof and when decreasing the input voltage, the optical power undergoes a transition to a small condition thereof. Further, it is assumed that as shown by transition lines 40A, 40B, the optical power increases or decreases in proportion to the increase or decrease of the input voltage.

As shown in FIG. 4A, the first liquid crystal lens 31A has the response characteristic in which the relationship between the input voltage $V_A$ and a transition of the optical power $P_A$ obtained by a control of the orientation of liquid crystal molecules in response to the input of the voltage $V_A$, a transition $N_{A1}$ from the large condition of the optical power $P_A$ to the small condition of the optical power $P_A$ is rapid and a transition $N_{A2}$ from the small condition of the optical power $P_A$ to the large condition of the optical power $P_A$ is slow.

As shown in FIG. 4B, the second liquid crystal lens 31B has the response characteristic which is a reverse response characteristic of the first liquid crystal lens 31A, in other words, a transition $N_{B2}$ from the small condition of the optical power $P_B$ to the large condition of the optical power $P_B$ is rapid in response to the input of the voltage $V_B$ and a transition $N_{B1}$ from the large condition of the optical power $P_B$ to the small condition of the optical power $P_B$ is slow.

In the liquid crystal lens optical body 30, a period of response time $T_{FA}$ when the optical power $P_A$ undergoes a transition from a large condition thereof to a small condition thereof, in the first liquid crystal lens 31A, is shorter than a period of response time $T_{FB}$ when the optical power $P_B$ undergoes a transition from a large condition thereof to a small condition thereof, in the second liquid crystal lens 31B.

On the other hand, a period of response time $T_{NB}$ when the optical power $P_B$ undergoes a transition from a small condition thereof to a large condition thereof, in the second liquid crystal lens 31B, is shorter than a period of response time $T_{NA}$ when the optical power $P_A$ undergoes a transition from a small condition thereof to a large condition thereof, in the first liquid crystal lens 31A.

An autofocus operation is carried out at a response of any of the first liquid crystal lens 31A and the second liquid crystal lens 31B, in which the transition of the optical power is rapid in response to the input of voltage, when performing the autofocus operation to be focused by allowing the optical power $P_T$ of the liquid crystal lens optical body 30 to undergo a transition to the large condition or allowing the optical power $P_T$ thereof to undergo a transition to the small condition, based on a distance up to the object to be read.

In this embodiment, when the optical power $P_T$ of the liquid crystal lens optical body 30 undergoes a transition from a large condition thereof to a small condition thereof, by operating the first liquid crystal lens 31A, the optical power $P_A$ of the first liquid crystal lens 31A undergoes a transition from a large condition thereof to a small condition thereof. Alternatively, when the optical power $P_T$ of the liquid crystal lens optical body 30 undergoes a transition from a small condition thereof to a large condition thereof, by operating the second liquid crystal lens 31B, the optical power $P_B$ of the second liquid crystal lens 31B undergoes a transition from a small condition thereof to a large condition thereof.

<Autofocus Operation of Liquid Crystal Lenses>

FIGS. 5A, 5B and 5C and FIGS. 6A, 6B and 6C are graphs each showing a relationship between an input voltage and a transition of optical power. The optical power of the first liquid crystal lens 31A is indicated at a position of a mark 41A on the transition line 40A indicated by dot chain line and the optical power of the second liquid crystal lens 31B is indicated at a position of a mark 41B on the transition line 40B indicated by two-dot chain line.

Figure 5A:
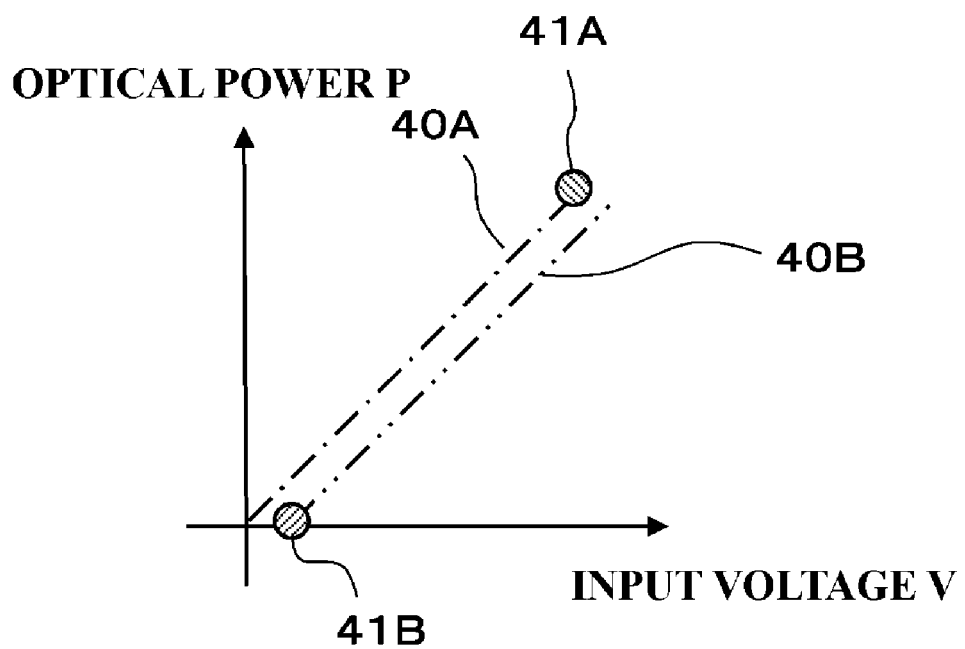
FIG. 5A is a graph showing a relationship between an input voltage and a transition of optical power.
Figure 5B:
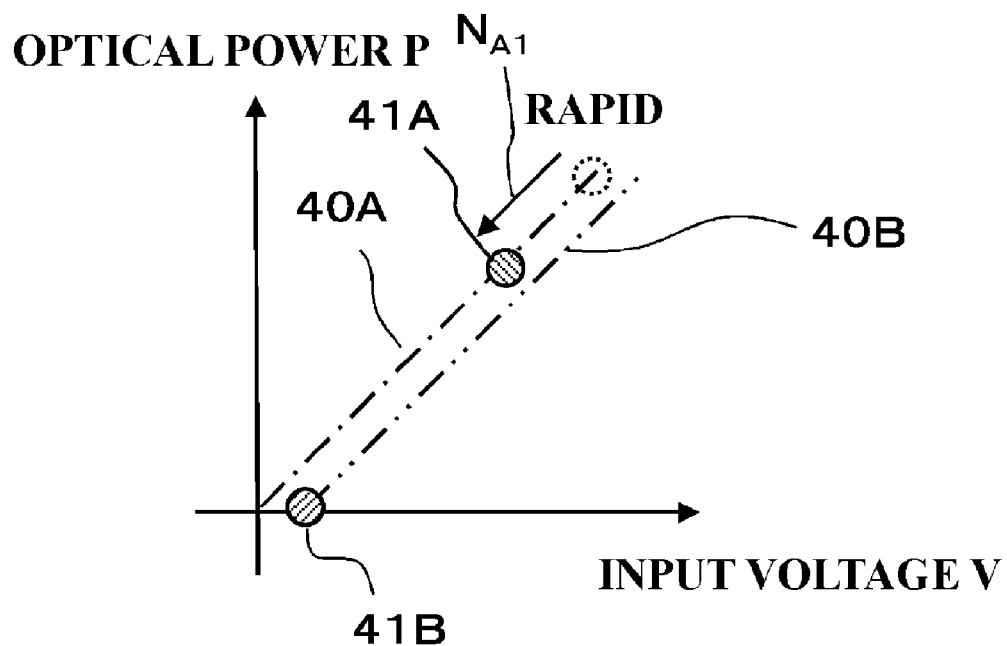
FIG. 5B is a graph showing a relationship between an input voltage and a transition of optical power.
Figure 5C:
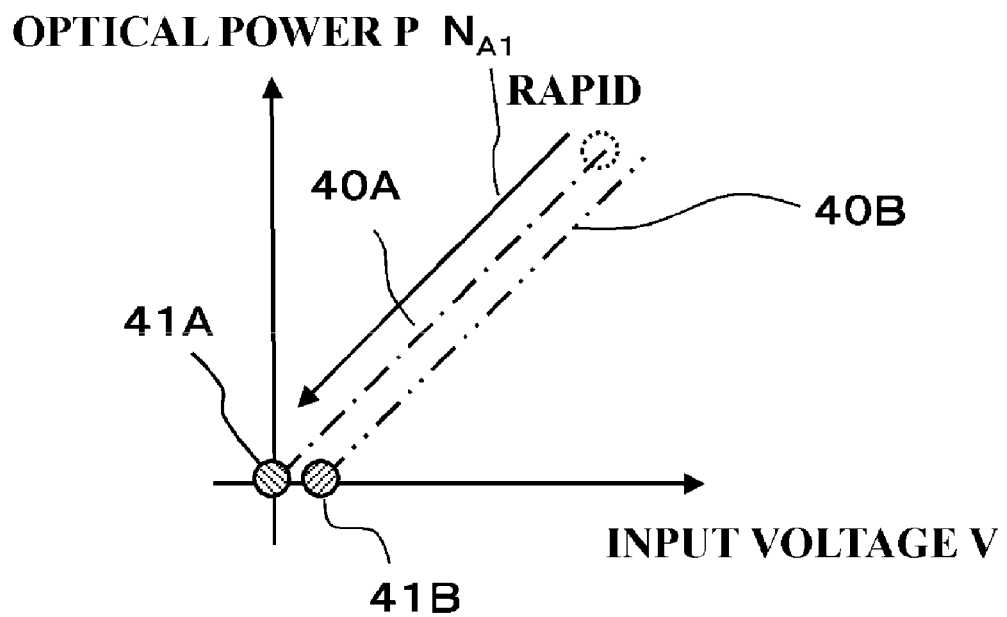
FIG. 5C is a graph showing a relationship between an input voltage and a transition of optical power.
Figure 6A:
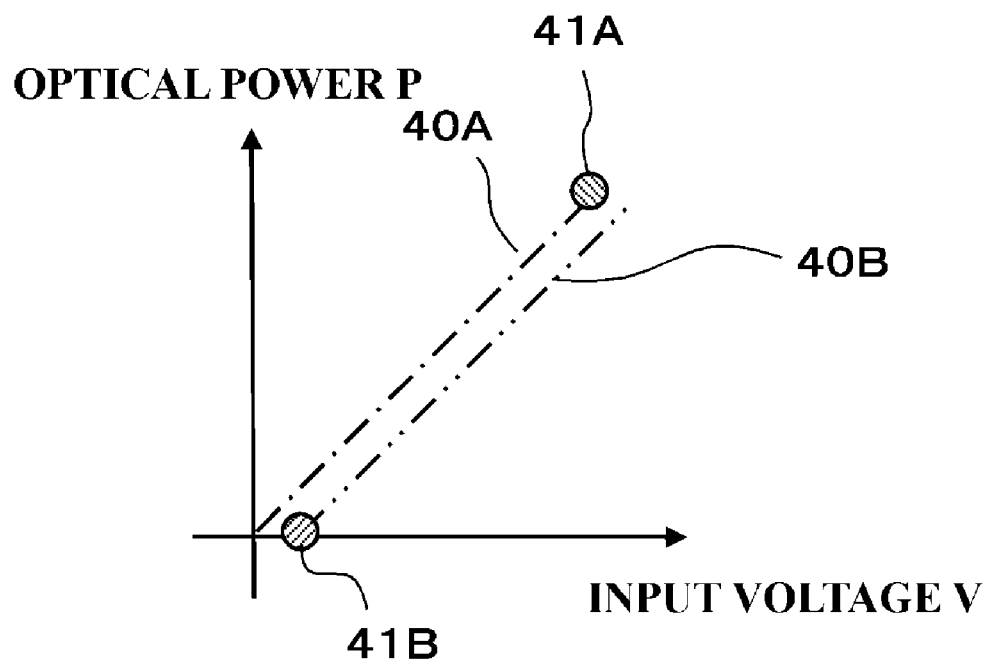
FIG. 6A is a graph showing a relationship between an input voltage and a transition of optical power.

Here, FIGS. 5A and 6A indicate a basis condition of the liquid crystal lens optical body 30. FIG. 5B indicates a process for allowing the optical power $P_A$ of the first liquid crystal lens 31A to undergo a transition from the basic condition of the liquid crystal lens optical body 30 to a small condition there and FIG. 5C indicates a condition in which the optical power $P_A$ of the first liquid crystal lens 31A undergoes a transition to a small condition and the optical power of the liquid crystal lens optical body 30 is made smallest.

Figure 6B:
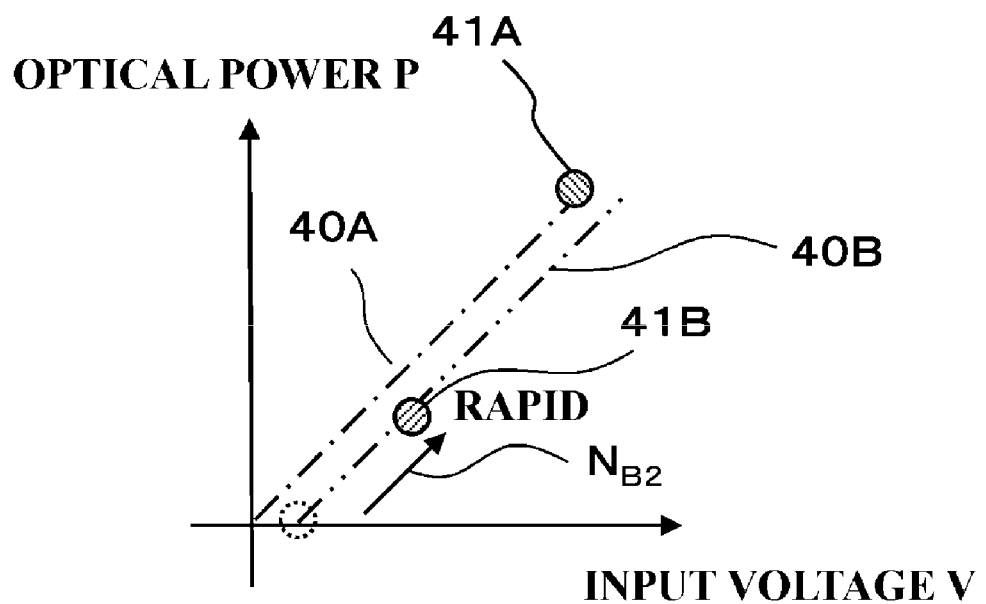
FIG. 6B is a graph showing a relationship between an input voltage and a transition of optical power.
Figure 6C:
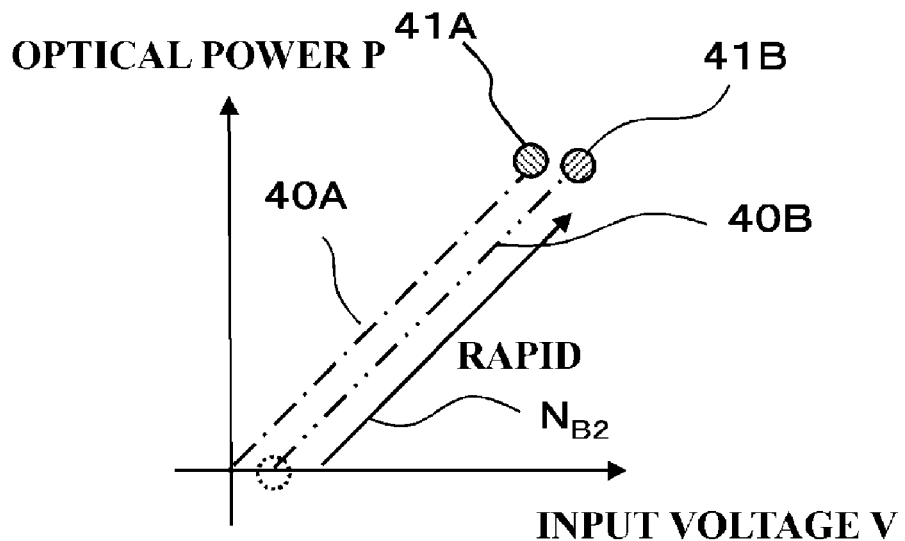
FIG. 6C is a graph showing a relationship between an input voltage and a transition of optical power

Further, FIG. 6B indicates a process for allowing the optical power $P_B$ of the second liquid crystal lens 31B to undergo a transition from the basic condition of the liquid crystal lens optical body 30 to a large condition and FIG. 6C indicates a condition in which the optical power $P_B$ of the second liquid crystal lens 31B undergoes a transition to a large condition and the optical power of the liquid crystal lens optical body 30 is made largest.

FIGS. 7A, 7B and 7C and FIGS. 8A, 8B and 8C are operational illustrations each illustrating an optical power by a schematic form of lenses. A positive condition of the optical power is illustrated by a shape of a convex lens and a negative condition of the optical power is illustrated by a shape of a concave lens. Further, a magnitude of the optical power is illustrated by a magnitude of convex or concave shape.

Figure 7A:
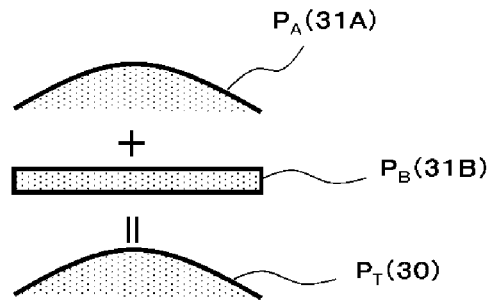
FIG. 7A is an operational illustration illustrating an optical power by a schematic form of lenses.
Figure 7B:
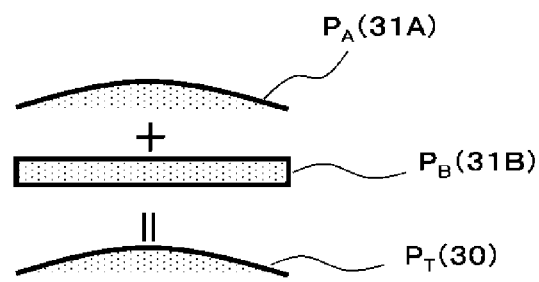
FIG. 7B is an operational illustration illustrating an optical power by a schematic form of lenses.
Figure 7C:
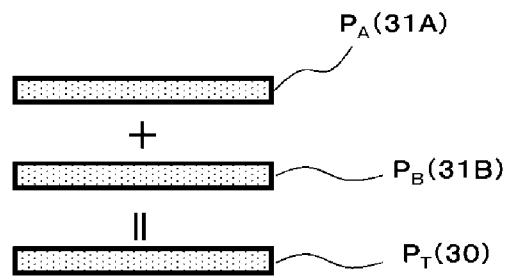
FIG. 7C is an operational illustration illustrating an optical power by a schematic form of lenses.
Figure 8A:
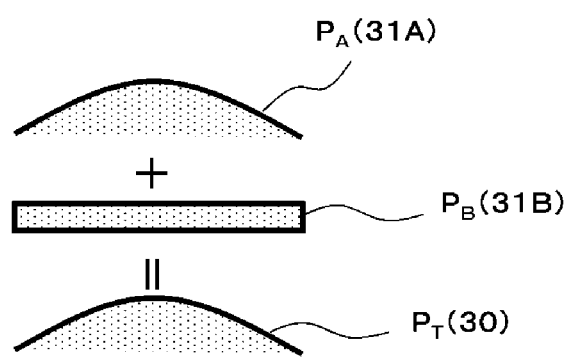
FIG. 8A is an operational illustration illustrating an optical power by a schematic form of lenses.

Here, FIG. 7A corresponds to FIG. 5A and FIG. 8A corresponds to FIG. 6A, which indicate the basis condition of the liquid crystal lens optical body 30. FIG. 7B corresponds to FIG. 5B, which indicates the process for allowing the optical power $P_A$ of the first liquid crystal lens 31A to undergo a transition to a small condition thereof. FIG. 7C corresponds to FIG. 5C, which indicates a condition in which the optical power of the liquid crystal lens optical body 30 is made smallest.

Figure 8B:
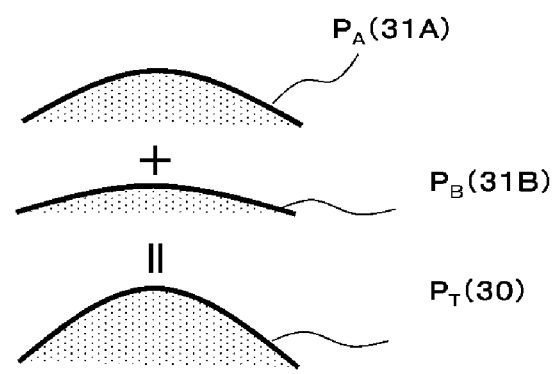
FIG. 8B is an operational illustration illustrating an optical power by a schematic form of lenses.
Figure 8C:
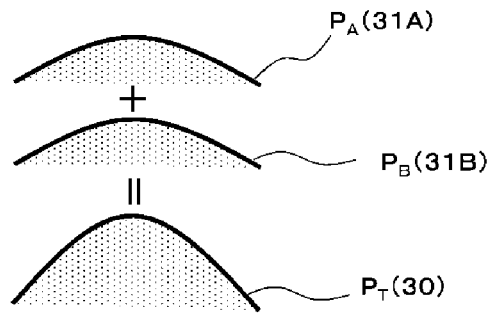
FIG. 8C is an operational illustration illustrating an optical power by a schematic form of lenses.

FIG. 8B corresponds to FIG. 6B, which indicates the process for allowing the optical power $P_B$ of the second liquid crystal lens 31B to undergo a transition to a large condition thereof. FIG. 8C corresponds to FIG. 6C, which indicates a condition in which the optical power of the liquid crystal lens optical body 30 is made largest.

In this embodiment, as shown in FIGS. 5A and 6A, it is assumed that a condition in which the optical power $P_A$ of the first liquid crystal lens 31A is made largest and the optical power $P_B$ of the second liquid crystal lens 31B is made smallest is the basic condition of the liquid crystal lens optical body 30. For example, when the focus is changed from L1 (mm) to infinity in the liquid crystal lens optical body 30, a position at a predetermined distance L2 (mm) between the distance L1 and the infinity is in focus on the basic condition of the liquid crystal lens optical body 30.

When a distance up to the object to be read is far away from L2 for the liquid crystal lens optical body 30 which is in the basic condition, it is required to allow the optical power $P_T$ of the liquid crystal lens optical body 30 to undergo a transition to a small condition thereof. As described above, the period of response time $T_{FA}$ when the optical power $P_A$ undergoes a transition from a large condition thereof to a small condition thereof, in the first liquid crystal lens 31A, is shorter than a period of response time $T_{FB}$ when the optical power $P_B$ undergoes a transition from a large condition thereof to a small condition thereof, in the second liquid crystal lens 31B.

Accordingly, when allowing the optical power $P_T$ of the liquid crystal lens optical body 30 to undergo a transition to a small condition thereof, as shown in FIGS. 5B and 7B, the optical power $P_A$ in the first liquid crystal lens 31A undergoes a transition from a large condition thereof to a small condition thereof. Thus, the optical power $P_T$ of the liquid crystal lens optical body 30 undergoes a transition to a small condition thereof at a shorter period of response time $T_{FA}$ than that of a case where the second liquid crystal lens 31B is operated so that an autofocus operation can be performed.

As shown in FIGS. 5C and 7C, the optical power $P_A$ in the first liquid crystal lens 31A then undergoes a transition to a small condition thereof and the optical power $P_A$ in the first liquid crystal lens 31A is made smallest, so that the optical power $P_T$ of the liquid crystal lens optical body 30 is made smallest, which allows being in focus on the infinity.

On the other hand, when a distance up to the object to be read is not far away from L2 for the liquid crystal lens optical body 30 which is in the basic condition, it is required to allow the optical power $P_T$ of the liquid crystal lens optical body 30 to undergo a transition to a large condition thereof. As described above, the period of response time $T_{NB}$ when the optical power $P_B$ undergoes a transition from a small condition thereof to a large condition thereof, in the second liquid crystal lens 31B, is shorter than a period of response time $T_{NA}$ when the optical power $P_A$ undergoes a transition from a small condition thereof to a large condition thereof, in the first liquid crystal lens 31A.

Accordingly, when allowing the optical power $P_T$ of the liquid crystal lens optical body 30 to undergo a transition to a large condition thereof, as shown in FIGS. 6B and 8B, the optical power $P_B$ in the second liquid crystal lens 31B undergoes a transition from a small condition thereof to a large condition thereof. Thus, the optical power $P_T$ of the liquid crystal lens optical body 30 undergoes a transition to a large condition thereof at a shorter period of response time $T_{NB}$ than that of a case where the first liquid crystal lens 31A is operated so that an autofocus operation can be performed.

As shown in FIGS. 6C and 8C, the optical power $P_B$ in the second liquid crystal lens 31B then undergoes a transition to a large condition thereof and the optical power $P_B$ in the second liquid crystal lens 31B is made largest, so that the optical power $P_T$ of the liquid crystal lens optical body 30 is made largest, which allows being in focus on the distance L1 that is nearest of the distances on which it is capable of being in focus.

<Return Operation of Liquid Crystal Lenses>

Figure 9A:
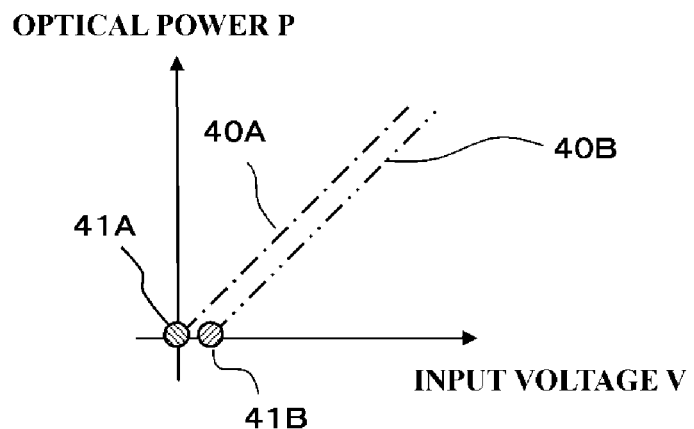
FIG. 9A is a graph showing a relationship between an input voltage and a transition of optical power.
Figure 9B:
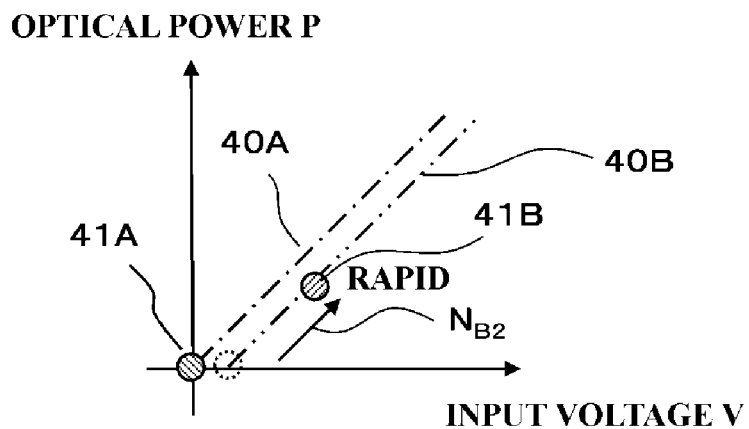
FIG. 9B is a graph showing a relationship between an input voltage and a transition of optical power.
Figure 9C:
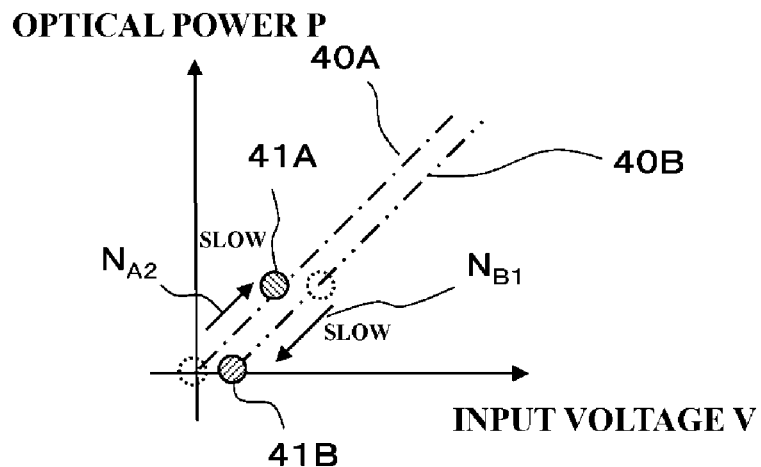
FIG. 9C is a graph showing a relationship between an input voltage and a transition of optical power.

FIGS. 9A, 9B and 9C are graphs each showing a relationship between an input voltage and a transition of optical power. FIG. 9A indicates a condition in which the optical power of the liquid crystal lens optical body 30 is made smallest. FIG. 9B indicates an autofocus operation from the condition in which the optical power of the liquid crystal lens optical body 30 is made smallest. FIG. 9C indicates a return operation after the autofocus.

Figure 10A:
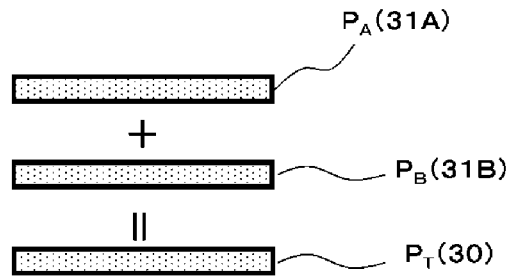
FIG. 10A is an operational illustration illustrating an optical power by a schematic form of lenses.
Figure 10B:
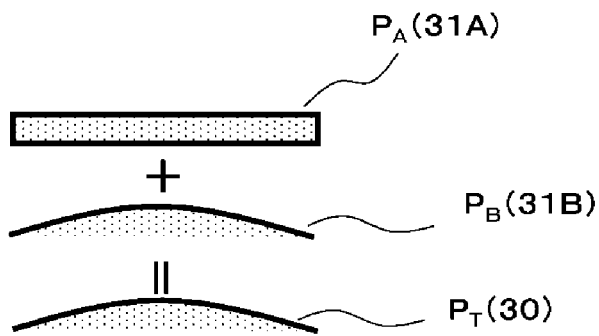
FIG. 10B is an operational illustration illustrating an optical power by a schematic form of lenses.
Figure 10C:
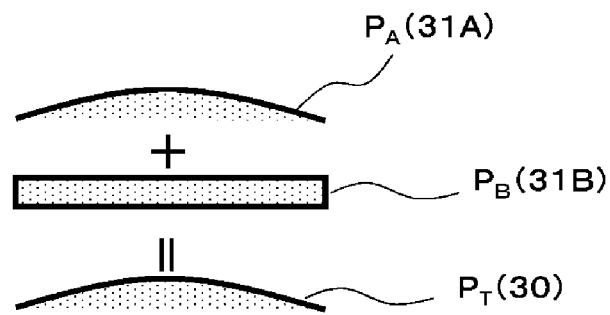
FIG. 10C is an operational illustration illustrating an optical power by a schematic form of lenses.

FIGS. 10A, 10B and 10C are operational illustrations each illustrating an optical power by a schematic form of lenses. FIG. 10A corresponds to FIG. 9A, which indicate the condition in which the optical power of the liquid crystal lens optical body 30 is made smallest. FIG. 10B corresponds to FIG. 9B, which indicates the autofocus operation from the condition in which the optical power of the liquid crystal lens optical body 30 is made smallest. FIG. 10C corresponds to FIG. 9C, which indicates the return operation after the autofocus.

In this embodiment, as shown in FIGS. 9A and 10A, by making the optical power $P_A$ in the first liquid crystal lens 31A and the optical power $P_B$ in the second liquid crystal lens 31B smallest, an autofocus operation from the condition in which the optical power $P_T$ of the liquid crystal lens optical body 30 is made smallest and the return operation after the autofocus operation will be considered.

When bringing into focus the object to be read which exists away by an optional distance from the liquid crystal lens optical body 30, the optical power $P_T$ of which is made smallest, it is required to allow the optical power $P_T$ of the liquid crystal lens optical body 30 to undergo a transition to a large condition thereof. As described above, the period of response time $T_{NB}$ when the optical power $P_B$ undergoes a transition from a small condition thereof to a large condition thereof, in the second liquid crystal lens 31B, is shorter than a period of response time $T_{NA}$ when the optical power $P_A$ undergoes a transition from a small condition thereof to a large condition thereof, in the first liquid crystal lens 31A.

Accordingly, when allowing the optical power $P_T$ of the liquid crystal lens optical body 30 to undergo a transition to a large condition thereof, as shown in FIGS. 9B and 10B, the optical power $P_B$ in the second liquid crystal lens 31B undergoes a transition from a small condition thereof to a large condition thereof. Thus, the optical power $P_T$ of the liquid crystal lens optical body 30 undergoes a transition to a large condition thereof at a shorter period of response time $T_{NB}$ than that of a case where the first liquid crystal lens 31A is operated so that an autofocus operation can be performed.

On the autofocus operation and the non-operation in which no imaging is performed, using a response of any of the first liquid crystal lens 31A and the second liquid crystal lens 31B, a transition of the optical power of which is slow, the return operation is performed without changing the optical power $P_T$ of whole of the liquid crystal lens optical body 30.

In this embodiment, as shown in FIGS. 9C and 10C, on the return operation, the optical power $P_A$ of the first liquid crystal lens 31A undergoes a transition from a small condition thereof to a large condition thereof and the optical power $P_B$ of the second liquid crystal lens 31B undergoes a transition from a large condition thereof to a small condition thereof, so that the optical powers are changed with the focus being fixed so that the optical power $P_T$ of whole of the liquid crystal lens optical body 30 is not changed.

Thus, the second liquid crystal lens 31B returns to a condition in which the optical power $P_B$ is made smallest and in the first liquid crystal lens 31A, the optical power $P_A$ undergoes a transition to a large condition thereof according to a distance up to the object to be read at the autofocusing time, so that the liquid crystal lens optical body 30 is close to the basic condition thereof. Accordingly, when further returning to the basic condition thereof, the period of response time is shortened by a period of time when the transition for returning to the basic condition thereof is performed.

<Selection of Basic Condition of Liquid Crystal Lens Optical Body>

Figure 11A:
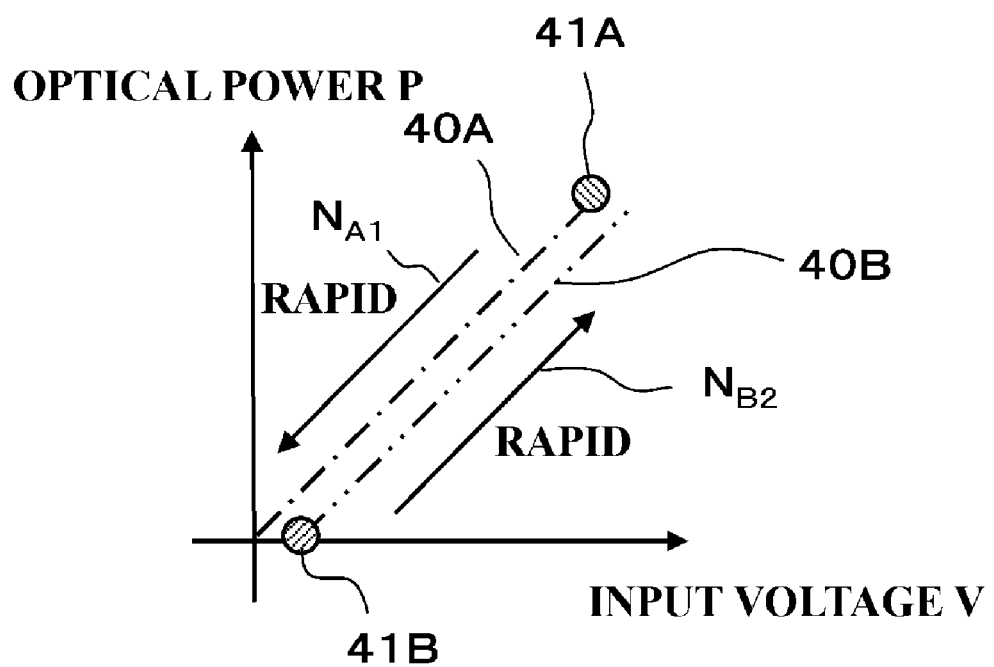
FIG. 11A is a graph showing a relationship between an input voltage and a transition of optical power.
Figure 11B:
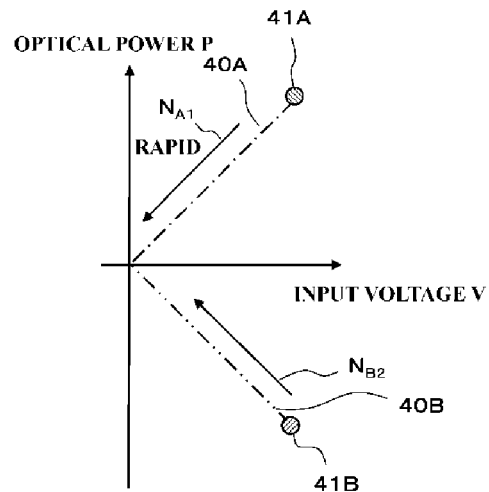
FIG. 11B is a graph showing a relationship between an input voltage and a transition of optical power.

FIGS. 11A and 11B are graphs each showing a relationship between an input voltage and a transition of optical power. FIG. 11A indicates a condition in which the second liquid crystal lens $31B_1$, the optical power $P_B$ of which undergoes a transition within a positive region, is used. FIG. 11B indicates a condition in which the second liquid crystal lens $31B_2$, the optical power $P_B$ of which undergoes a transition within a negative region, is used.

Figure 12A:
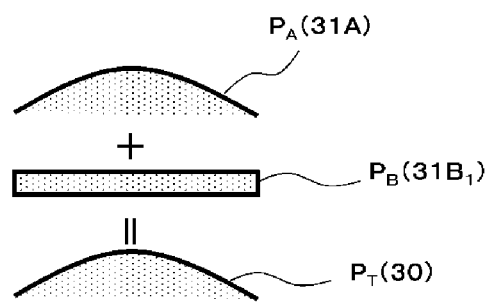
FIG. 12A is an operational illustration illustrating an optical power by a schematic form of lenses.
Figure 12B:
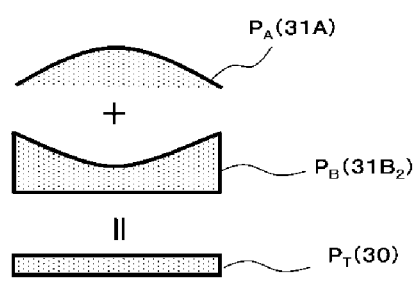
FIG. 12B is an operational illustration illustrating an optical power by a schematic form of lenses.

Further, FIGS. 12a and 12B are operational illustrations each illustrating an optical power by a schematic form of lenses. FIG. 12A corresponds to FIG. 11A, which indicate the condition in which the second liquid crystal lens $31B_1$, the optical power $P_B$ of which undergoes a transition within a positive region, is used. FIG. 12B corresponds to FIG. 11B, which indicates the condition in which the second liquid crystal lens $31B_2$, the optical power $P_B$ of which undergoes a transition within a negative region, is used.

The liquid crystal lens optical body 30 may be a combination of liquid crystal lenses having a characteristic such that in response to the input of voltage, a period of response time when the optical power undergoes a transition from the large condition to the small condition and a period of response time when the optical power undergoes a transition from the small condition to the large condition are reversed. A power range of the lenses may be optional.

Namely, the liquid crystal lens optical body is available in which the second liquid crystal lens $31B_1$, the optical power $P_B$ of which undergoes a transition within a positive region, is used as one liquid crystal lens, as shown in FIGS. 11A and 12A or the liquid crystal lens optical body is available in which the second liquid crystal lens $31B_2$, the optical power $P_B$ of which undergoes a transition within a negative region, is used as one liquid crystal lens, as shown in FIGS. 11B and 12B. Alternatively, the one in which the optical power thereof undergoes a transition within positive and negative regions may be used.

It is determined by the selection of the basic condition of the liquid crystal lens optical body 30 to use any of the liquid crystal lenses, the optical power of which undergoes a transition within the positive region, the positive region and the positive and negative regions.

For example, in the liquid crystal lens optical body combining the first liquid crystal lens 31A, the optical power $P_A$ of which undergoes a transition within a positive region, with the second liquid crystal lens $31B_1$, the optical power $P_B$ of which undergoes a transition within a positive region, the basic condition of the liquid crystal lens optical body is a convex lens when the basic condition thereof is the condition shown in FIGS. 11A and 12A. The liquid crystal lens, the optical power of which undergoes a transition within the positive region, can be realized under, for example, an orientation film control to control an orientation direction of liquid crystal molecule in the liquid crystal lenses.

Further, in the liquid crystal lens optical body combining the first liquid crystal lens 31A, the optical power $P_A$ of which undergoes a transition within a positive region, with the second liquid crystal lens $31B_2$, the optical power $P_B$ of which undergoes a transition within a negative region, the basic condition of the liquid crystal lens optical body is equal to a flat plate one when the basic condition thereof is the condition shown in FIGS. 11B and 12B.

Figure 13:
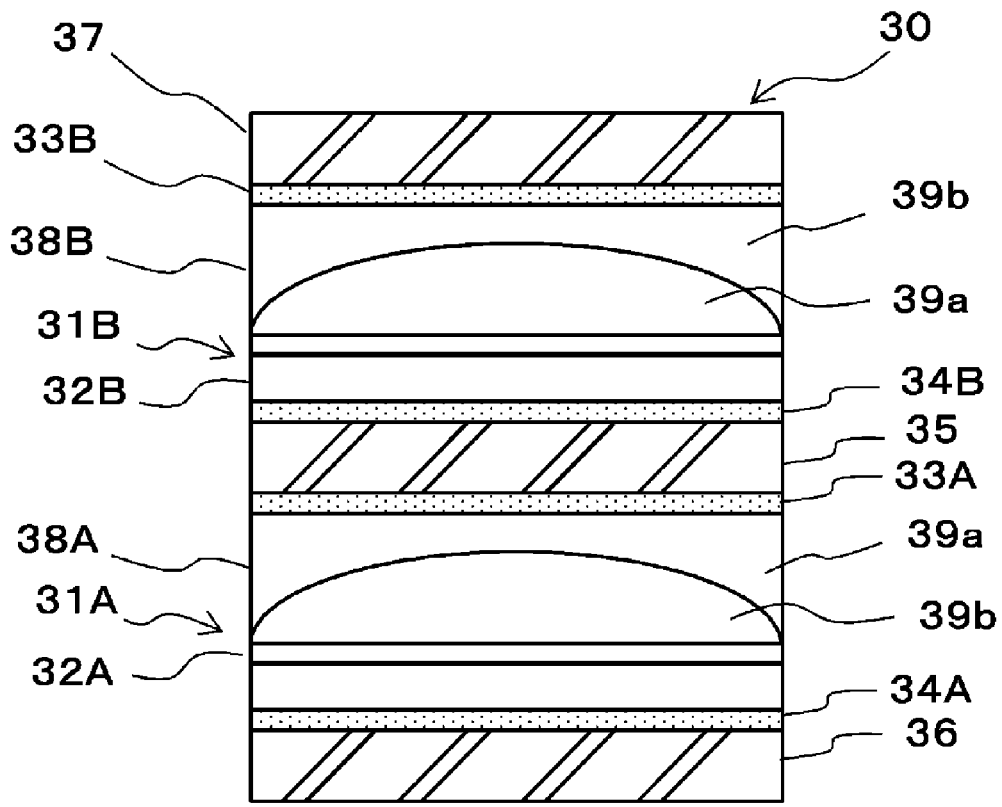
FIG. 13 is a configuration diagram of a liquid crystal lens optical body, which is provided with liquid crystal lenses, the optical power of each of which undergoes a transition in the negative region, for showing an example thereof.

FIG. 13 is a configuration diagram of a liquid crystal lens optical body, which is provided with liquid crystal lenses, the optical power of each of which undergoes a transition in the negative region, for showing an example thereof. The liquid crystal lens optical body 30 is composed of two layers of liquid crystal lenses of a first liquid crystal lens 31A and a second liquid crystal lens 31B. The first liquid crystal lens 31A and the second liquid crystal lens 31B are arranged on an optical axis thereof.

The first liquid crystal lens 31A is configured so that a liquid crystal layer 32A and a dielectric layer 38A are held between an electrode 33A and an electrode 34A. The second liquid crystal lens 31B is configured so that a liquid crystal layer 32B and a dielectric layer 38B are held between an electrode 33B and an electrode 34B. Each of the electrodes 33A, 33B, 34A and 34B is made of any transparent materials of Indium Tin Oxide (ITO).

The dielectric layer 38A of the first liquid crystal lens 31A is configured so as to have a first dielectric body 39a and a second dielectric body 39b, which are different from each other in a dielectric constant, so that the first dielectric body 39a is configured so as to be a concave lens and the second dielectric body 39b is configured so as to be a convex lens. The first dielectric body 39a is made of, for example, a mixture of water and glycerin and has a dielectric constant of $\in_1$. The second dielectric body 39b is made of, for example, glass and has a dielectric constant of $\in_2$. Further, the dielectric layer 38B of the second liquid crystal lens 31B is configured so that the first dielectric body 39a is configured so as to be a convex lens and the second dielectric body 39b is configured so as to be a concave lens.

The first liquid crystal lens 31A and the second liquid crystal lens 31B are laminated through glass 35 inserted therebetween. Further, the first liquid crystal lens 31A and the second liquid crystal lens 31B are held between glass 36 and glass 37.

In the first liquid crystal lens 31A and the second liquid crystal lens 31B, the voltages are separately controlled so that a voltage is applied to the electrode 33A and the electrode 34A in the first liquid crystal lens 31A and a voltage is applied to the electrode 33B and the electrode 34B in the second liquid crystal lens 31B.

In the first liquid crystal lens 31A, electric field distribution becomes a convex shape based on a shape of an interface between the first dielectric body 39a and the second dielectric body 39b in the dielectric layer 38A so that a convex lens, an optical power of which undergoes a transition within the positive region, is configured. On the other hand, in the second liquid crystal lens 31B, electric field distribution becomes a concave shape based on a shape of an interface between the first dielectric body 39a and the second dielectric body 39b in the dielectric layer 38B so that a concave lens, an optical power of which undergoes a transition within the negative region, is configured.

<Optimal Operation of Liquid Crystal Lens Optical Body>

In the above description, when performing the autofocus operation, a rapid response has been realized by performing the autofocus operation at a response of the first liquid crystal lens 31A or the second liquid crystal lens 31B, in which a transition of the optical power is more rapid in relation to the input of voltage. On the other hand, by realizing an amount of the transition of the optical power according to a distance up to the object to be read using a total of the amounts of the transition of the optical powers in plural liquid crystal lenses, not by operating only one of the liquid crystal lenses, an optimization of the autofocus operation may be realized.

Figure 14:
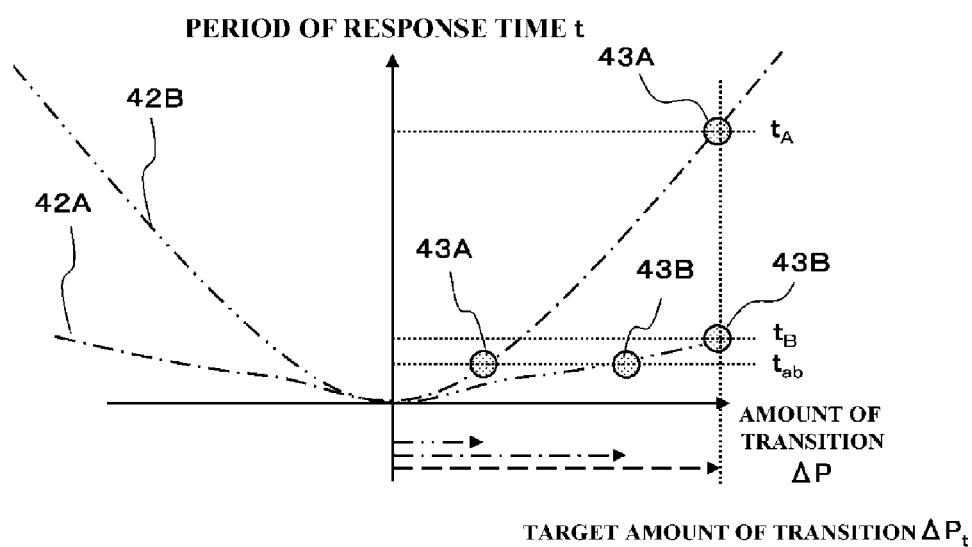
FIG. 14 is a graph showing a relationship between an amount of transition of the optical power and a period of response time.

FIG. 14 is a graph showing a relationship between an amount of transition of the optical power and a period of response time. The transition curve 42A indicated by dot chain line indicates a relationship between an amount of the transition of the optical power and a period of response time in the first liquid crystal lens 31A and the transition curve 42B indicated by two-dot chain line indicates a relationship between an amount of the transition of the optical power and a period of response time in the second liquid crystal lens 31B.

When the first liquid crystal lens 31A operates to allow the optical power thereof to undergo a transition, a position of a mark 43A on the transition curve 42A indicates a period of response time until it reaches a target amount of transition. When the second liquid crystal lens 31B operates to allow the optical power thereof to undergo a transition, a position of a mark 43B on the transition curve 42B indicates a period of response time until it reaches a target amount of transition.

When the target amount of transition is set as to be $\Delta P_t$ and the optical power of only the first liquid crystal lens 31A undergoes a transition, a period of response time until it reaches the target amount of transition $\Delta P_t$ is estimated as to be $t_A$. Further, when the optical power of only the second liquid crystal lens 31B undergoes a transition, a period of response time until it reaches the target amount of transition $\Delta P_t$ is estimated as to be $t_B$. Additionally, when the optical power of a combination of the first liquid crystal lens 31A and the second liquid crystal lens 31B undergoes a transition, a period of response time until it reaches the target amount of transition $\Delta P_t$ is estimated as to be $t_{AB}$.

The first liquid crystal lens 31A has a characteristic, as described above, such that a period of response time until it reaches the target amount of transition is more rapid along a direction in which the optical power is made smaller and is slower along a direction in which the optical power is made larger. Further, the second liquid crystal lens 31B has a characteristic such that a period of response time until it reaches the target amount of transition is more rapid along a direction in which the optical power is made larger and is slower along a direction in which the optical power is made smaller.

For example, when allowing the optical power of the liquid crystal lens optical body to undergo a transition to the large condition thereof, the period of response time $t_{AB}$ until it reaches the target amount of transition $\Delta P_t$ at a total of an amount of transition of the optical power in the first liquid crystal lens 31A and an amount of transition of the optical power in the second liquid crystal lens 31B may be shorter than the period of response time $t_B$ until it reaches the target amount of transition $\Delta P_t$ by allowing the optical power to undergo a transition using only the second liquid crystal lens 31B in which the transition thereof is more rapid along a direction in which the optical power is made larger.

<Examples of Numerical Values on Amount of Transition of Optical Power and Period of Response Time>

Figure 15A:
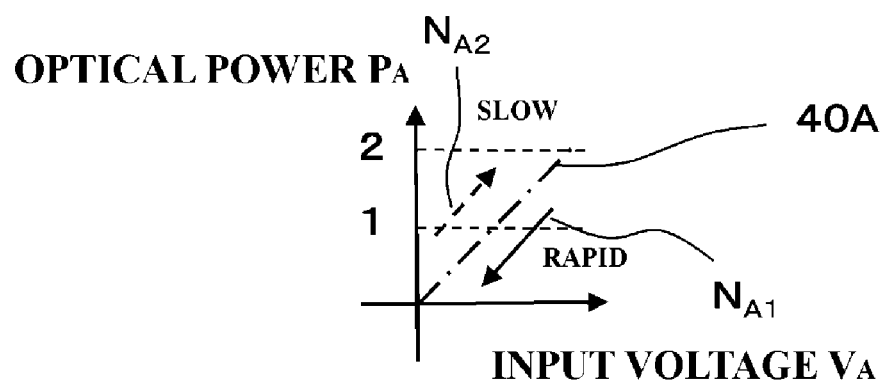
FIG. 15A is a graph showing a relationship between an input voltage and a transition of optical power.
Figure 15B:
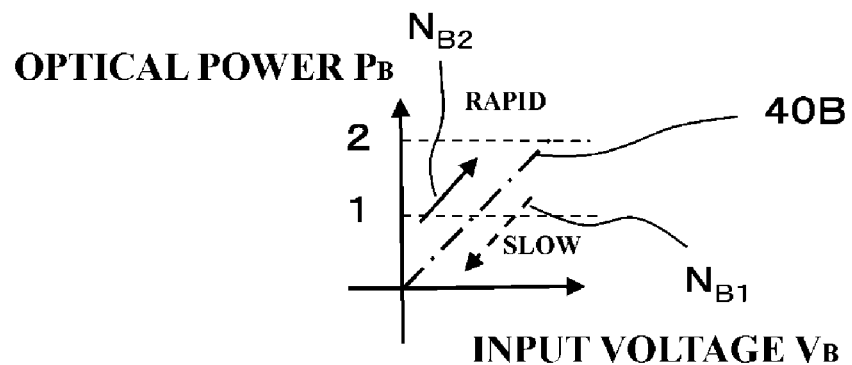
FIG. 15B is a graph showing a relationship between an input voltage and a transition of optical power.
Figure 16:
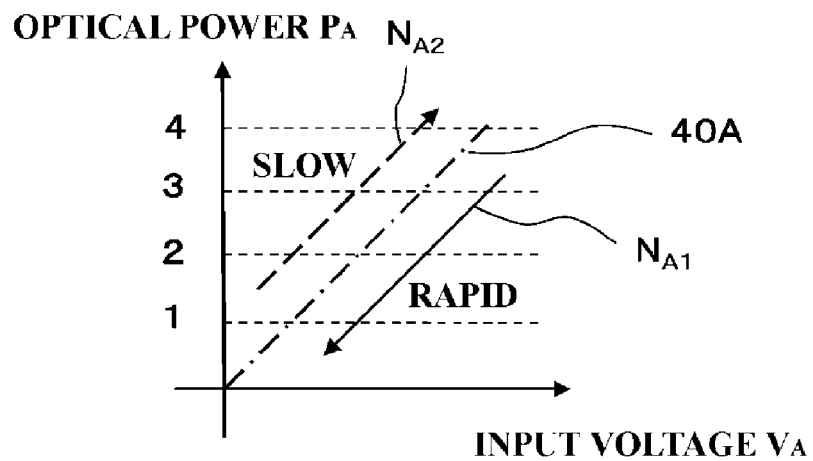
FIG. 16 is a graph showing a relationship between an input voltage and a transition of optical power.

FIGS. 15A, 15B and 16 are graphs each showing a relationship between an input voltage and a transition of optical power. FIG. 15A indicates a response characteristic of the first liquid crystal lens 31A and FIG. 15B indicates a response characteristic of the second liquid crystal lens 31B. Further, FIG. 16 indicates a response characteristic of only the first liquid crystal lens 31A as a comparison example.

The following table 1 indicates target amounts of transition and periods of response time in a case of a combination of the first liquid crystal lens 31A and the second liquid crystal lens 31B. The table 2 indicates target amounts of transition and periods of response time in a case of only the first liquid crystal lens 31A as a comparison example.

TABLE 1

| CURRENT P | TARGET P | PERIOD OF RESPONSE TIME [ms] |
|---|---|---|
| FIRST LIQUID CRYSTAL LENS | | |
| 0 | 1 | 25 |
| 0 | 2 | 50 |
| 1 | 2 | 25 |
| 1 | 0 | 2.5 |
| 2 | 0 | 5 |
| 2 | 1 | 2.5 |
| SECOND LIQUID CRYSTAL LENS | | |
| 0 | 1 | 2.5 |
| 0 | 2 | 5 |

TABLE 1-continued

| CURRENT P | TARGET P | PERIOD OF RESPONSE TIME [ms] |
|---|---|---|
| 1 | 2 | 2.5 |
| 1 | 0 | 25 |
| 2 | 0 | 50 |
| 2 | 1 | 25 |

TABLE 2

ONLY FIRST LIQUID CRYSTAL LENS

| CURRENT P | TARGET P | PERIOD OF RESPONSE TIME [ms] |
|---|---|---|
| 0 | 2 | 50 |
| 0 | 4 | 100 |
| 2 | 4 | 50 |
| 2 | 0 | 5 |
| 4 | 0 | 10 |
| 4 | 2 | 5 |

Here, when comparing one liquid crystal lens with a combination of two liquid crystal lens, their amounts of transition of the optical power and periods of response time are proportioned. In a case of a combination of the first liquid crystal lens 31A and the second liquid crystal lens 31B, since the target amounts of transition are a total of the amounts of transition of the optical power of respective liquid crystal lenses, the first liquid crystal lens 31A itself and the first liquid crystal lens 31A combined with the second liquid crystal lens 31B are identical in the response characteristic but the maximum value of the optical power is half. Further, the first liquid crystal lens 31A and the second liquid crystal lens 31B have a reverse relationship on the period of response time and the amount of transition.

<Calculation Example of Amount of Transition of Optical Power>

Figure 17:
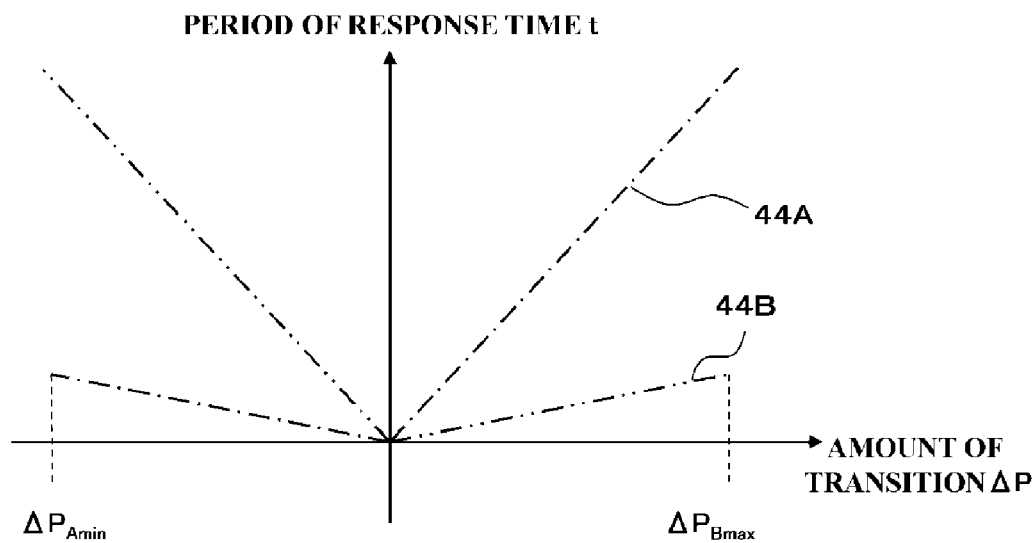
FIG. 17 is a graph showing a relationship between an amount of transition of the optical power and a period of response time.
Figure 18:
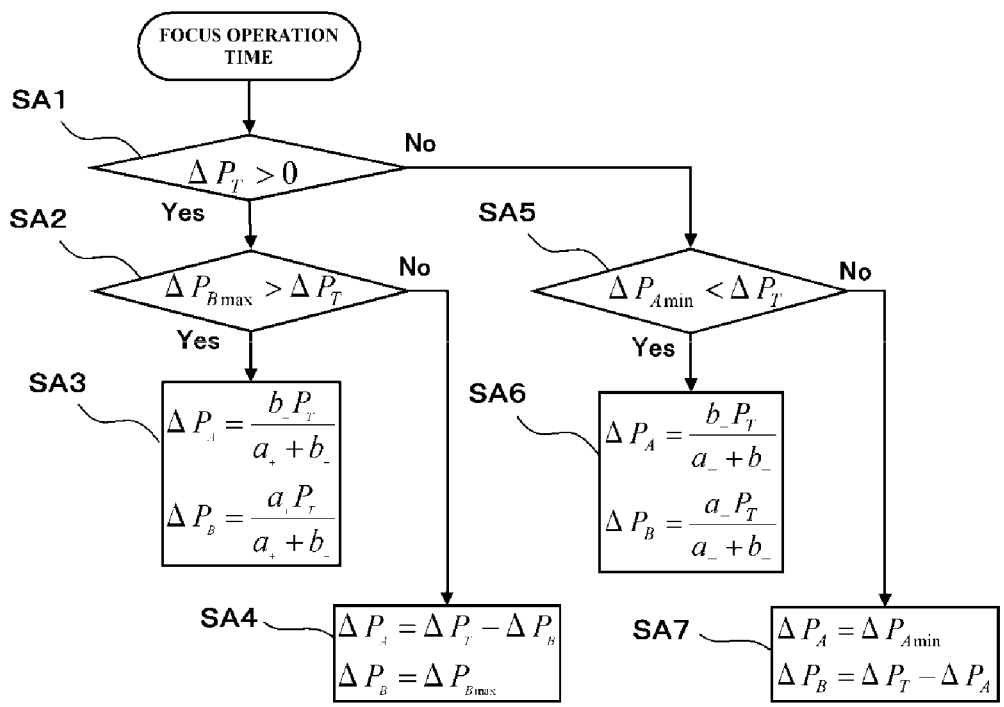
FIG. 18 is a flowchart showing a calculating method of the amount of transition of the optical power on operation time.

FIG. 17 is a graph showing a relationship between an amount of transition of the optical power and a period of response time. FIG. 18 is a flowchart showing a calculating method of the amount of transition of the optical power on a period of operation time. The following will describe the calculating method of the amount of transition of the optical power on a period of operation time of the autofocus.

In the following description, $\Delta P_T$ is a target amount of transition; $\Delta P_{Amin}$ is a potential minimum amount of transition of the first liquid crystal lens 31A; and $\Delta P_{Bmax}$ is a potential maximum amount of transition of the second liquid crystal lens 31B. Further, $\Delta P_A$ is an amount of transition of the first liquid crystal lens 31A to be calculated and $\Delta P_B$ is an amount of transition of the second liquid crystal lens 31B to be calculated. Additionally, "a" is a constant of proportionality which links the amount of transition of the first liquid crystal lens 31A with the period of response time and "b" is a constant of proportionality which links the amount of transition of the second liquid crystal lens 31B with the period of response time.

In FIG. 17, a transition line 44A which indicates a relationship between the amount of transition of the optical power and the period of response time in the first liquid crystal lens 31A is expressed as the following formula (1). A transition line 44B which indicates a relationship between the amount of transition of the optical power and the period of response time in the second liquid crystal lens 31B is expressed as the following formula (2).

[Formula 1]

$$f(\Delta P_A) = a\Delta P_A$$

$$a = a_+ (\Delta P_A > 0)$$

$$a = a_- (\Delta P_A < 0) \quad (1)$$

$$g(\Delta P_B) = b\Delta P_B$$

$$b = b_+ (\Delta P_B < 0)$$

$$b = b_- (\Delta P_B < 0) \quad (2)$$

In FIG. 18, at a step SA1, it is determined whether or not a target amount of transition $\Delta P_T$ exceeds zero. When it is determined that the target amount of transition $\Delta P_T$ exceeds zero, at a step SA2, it is determined whether or not the target amount of transition $\Delta P_T$ falls short of a potential maximum amount of transition $\Delta P_{Bmax}$ of the second liquid crystal lens 31B.

If it is determined that the target amount of transition $\Delta P_T$ falls short of the potential maximum amount of transition $\Delta P_{Bmax}$ of the second liquid crystal lens 31B, then the amount of transition $\Delta P_A$ of the first liquid crystal lens 31A and the amount of transition $\Delta P_B$ of the second liquid crystal lens 31B are obtained by the following formulae (3) and (4) at a step SA3.

If it is determined that the target amount of transition $\Delta P_T$ is the potential maximum amount of transition $\Delta P_{Bmax}$ of the second liquid crystal lens 31B or more, then the amount of transition $\Delta P_A$ of the first liquid crystal lens 31A and the amount of transition $\Delta P_B$ of the second liquid crystal lens 31B are obtained by the following formulae (5) and (6) at a step SA4.

[Formula 2]

$$\Delta P_A = \frac{b_+ P_T}{a_+ + b_+} \quad (3)$$

$$\Delta P_B = \frac{a_+ P_T}{a_+ + b_+} \quad (4)$$

$$\Delta P_A = \Delta P_T - \Delta P_B \quad (5)$$

$$\Delta P_B = \Delta P_{Bmax} \quad (6)$$

If it is determined that the target amount of transition $\Delta P_T$ falls short of zero at the step SA1, then it is determined whether or not a target amount of transition $\Delta P_T$ exceeds the potential minimum amount of transition $\Delta P_{Amin}$ of the first liquid crystal lens 31A at a step SA5.

If it is determined that a target amount of transition $\Delta P_T$ exceeds the potential minimum amount of transition $\Delta P_{Amin}$ of the first liquid crystal lens 31A, then the amount of transition $\Delta P_A$ of the first liquid crystal lens 31A and the amount of transition $\Delta P_B$ of the second liquid crystal lens 31B are obtained by the following formulae (7) and (8) at a step SA6.

If it is determined that a target amount of transition $\Delta P_T$ does not exceed the potential minimum amount of transition $\Delta P_{Amin}$ of the first liquid crystal lens 31A, then the amount of transition $\Delta P_A$ of the first liquid crystal lens 31A and the amount of transition $\Delta P_B$ of the second liquid crystal lens 31B are obtained by the following formulae (9) and (10) at a step SA7.

[Formula 3]

$$\Delta P_A = \frac{b_- P_T}{a_- + b_-} \quad (7)$$

$$\Delta P_B = \frac{a_- P_T}{a_- + b_-} \quad (8)$$

$$\Delta P_A = \Delta P_{Amin} \quad (9)$$

$$\Delta P_B = \Delta P_T - \Delta P_A \quad (10)$$

Figure 19:
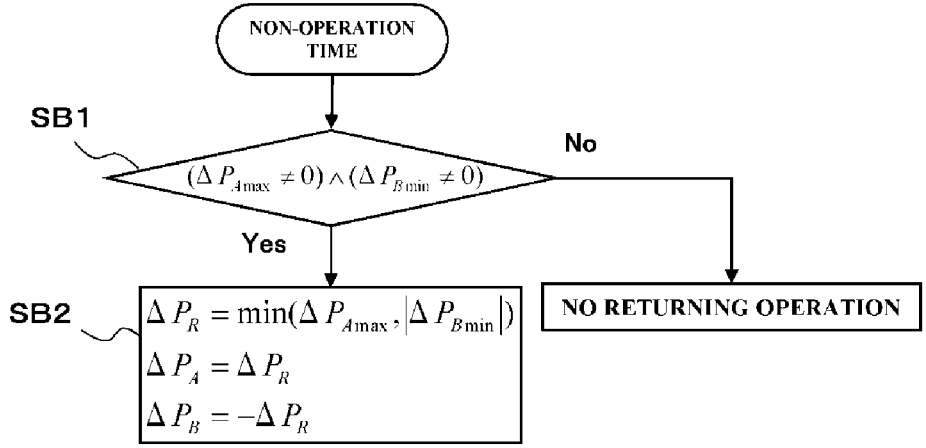
FIG. 19 is a flowchart showing a calculating method of the amount of transition of the optical power on non-operation time.

FIG. 19 is a flowchart showing a calculating method of the amount of transition of the optical power on non-operation time. The following will describe the calculating method of the amount of transition of the optical power on non-operation time while the focus is fixed.

In the following description, $\Delta P_{Amax}$ is a potential maximum amount of transition of the first liquid crystal lens 31A and $\Delta P_{Bmin}$ is a potential minimum amount of transition of the second liquid crystal lens 31B. Further, $\Delta P_R$ is a smaller one of "s" and "t" of amounts of transition min (s, t) from which both liquid crystal lenses can be returned to their basic conditions.

In FIG. 19, at a step SB1, it is determined whether or not the potential maximum amount of transition $\Delta P_{Amax}$ of the first liquid crystal lens 31A is not zero and the potential minimum amount of transition $\Delta P_{Bmin}$ of the second liquid crystal lens 31B is not zero. If a requirement of the step SB1 is satisfied, at a step SB2, then the amount of transition $\Delta P_R$ from which the first liquid crystal lens 31A and the second liquid crystal lens 31B can be returned to their basic conditions is obtained by the following formula (11). From the amount of transition $\Delta P_R$, the amount of transition $\Delta P_A$ of the first liquid crystal lens 31A and the amount of transition $\Delta P_B$ of the second liquid crystal lens 31B are obtained by the following formulae (12) and (13). It is to be noted that if the requirement of the step SB1 is not satisfied, then no returning operation is performed.

[Formula 4]

$$\Delta P_R = \min(\Delta P_{Amax}, |\Delta P_{Bmin}|) \quad (11)$$

$$\Delta P_A = \Delta P_R \quad (12)$$

$$\Delta P_B = -\Delta P_R \quad (13)$$

<Comparison Results>

When using the liquid crystal lenses having the response characteristics shown in the above FIGS. 15A, 15B and 16 and the tables 1 and 2, the amount of transition of each liquid crystal lens which becomes the target amount of transition is calculated in the flowcharts of FIGS. 18 and 19 and the periods of response time when it becomes the target amount of transition will be shown in a table 3.

Figure 20:
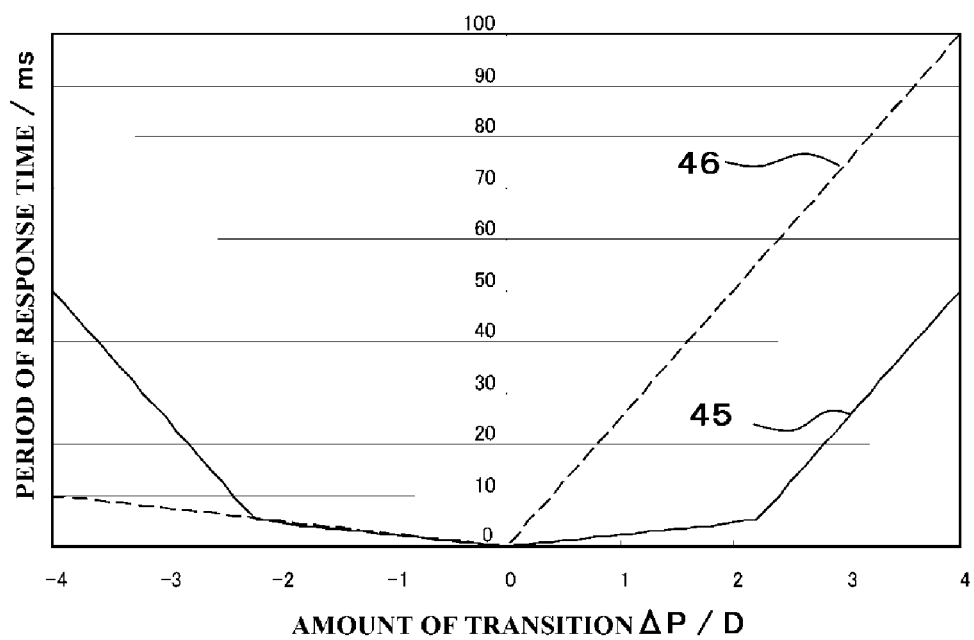
FIG. 20 is a graph showing a relationship between an amount of transition of the optical power and a period of response time.

Further, FIG. 20 is a graph showing a relationship between an amount of transition of the optical power and a period of response time. A transition line 45 shown by a solid line indicates a relationship between a target amount of transition and a period of response time in a case of a combination of the first liquid crystal lens 31A and the second liquid crystal lens 31B and a transition line 46 shown by a broken line indicates a relationship between a target amount of transition and a period of response time in a case of only the first liquid crystal lens 31A as a comparison example.

TABLE 3

| TRANSITION OF POWER P | RESPONSE OF PA [ms] | RESPONSE OF PA AND PB [ms] |
|---|---|---|
| 0⇒2 | 50 | 4.5 |
| 0⇒4 | 100 | 50 |
| 2⇒4 | 50 | 4.5 |
| 4⇒0 | 10 | 50 |
| 4⇒2 | 5 | 4.5 |
| 2⇒0 | 5 | 4.5 |

In the table 3, by comparing the period of response time in a case of a combination of the first liquid crystal lens 31A and the second liquid crystal lens 31B with the period of response time in a case of only the first liquid crystal lens 31A, it is seen that in the case of a combination of transitions of the optical power in the first liquid crystal lens 31A and the second liquid crystal lens 31B, the period of response time is shorter in general so that a maximum period of response time that is a bottleneck on the autofocus time is short.

Furthermore, although a case may exist where a period of response time becomes shorter by operating only one liquid crystal lens in the autofocus operation in which the maximum amount of transition of the liquid crystal lens is used, it is understood that in an actual operation, the transition which is smaller than that of focus in which the maximum amount of transition of the optical power in the liquid crystal lens is used is often used so that it is fully effective to realize an amount of transition of the optical power according to a distance up to the object to be read using a total of amounts of transition of the optical powers in the plural liquid crystal lenses to optimize the autofocus operation.

It is to be noted that although the liquid crystal lens optical body has been described in the above description so that it is configured to be provided with two liquid lenses, it may be configured to be provided with more than two liquid crystal lenses. When it is configured to be provided with more than two liquid crystal lenses, more rapid response may be attained.

<Algorism of Imaging Decode>

Figure 21:
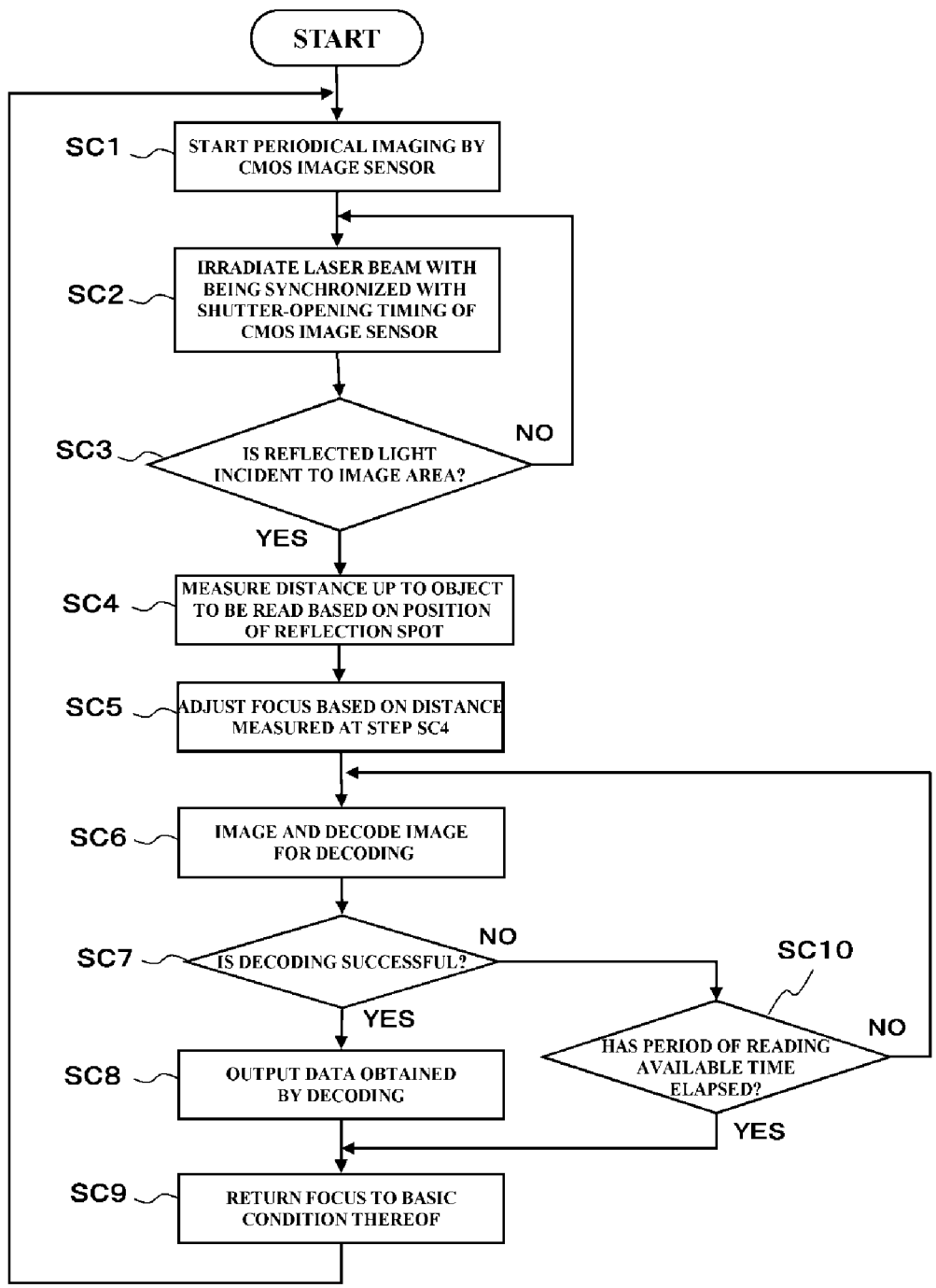
FIG. 21 is a flowchart showing an example of reading process which is implemented in the optical-information-reading apparatus.

FIG. 21 is a flowchart showing an example of reading process which is implemented in the optical-information-reading apparatus. The following will describe the reading process of the code symbol 100 in the optical-information-reading apparatus 1A.

First, at a step SC1, the CMOS image sensor 12 starts periodical imaging. In this moment, a shutter speed is set so as to selectively detect a reflected light of the laser beam output from the laser beam generator 14, not to detect little surrounding ambient light, which has larger intensity than that of the ambient light.

At a next step SC2, CPU 210 supplies any suitable control signal to the laser beam generator 14 and allows the laser beam generator 14 to irradiate the laser beam 14a with being synchronized with a shutter-opening timing of the CMOS image sensor 12 (starting timing of electric charge storage by the photodiode).

At a step SC3, image data output from the CMOS image sensor 12 is analyzed and it is determined whether or not the reflected light of the laser beam is incident to an image area 120 of the CMOS image sensor 12, namely, whether or not a spot of the reflected light appears in the image data.

Here, if the reflected light is not incident, then CPU 210 goes back to the step SC2 where the process is repeated, not goes to any following processes of reading condition adjustment and imaging for reading, because it is conceivable that the object to be read does not exist in a position where the optical-information-reading apparatus 1A can read it. When detecting no object to be read even after the repetition within a predetermined period of time, a frame speed of the CMOS image sensor 12 may be briefly slower (a frame period thereof may become longer).

Alternatively, if the reflected light of the laser beam is incident at the step SC3, it is understood that there is any object (which is estimated so as to be the object to be read) in a position where the optical-information-reading apparatus 1A can read the code symbol 100. In other words, it is capable of detecting the object to be read.

<Measurement of Distance>

Figure 22:
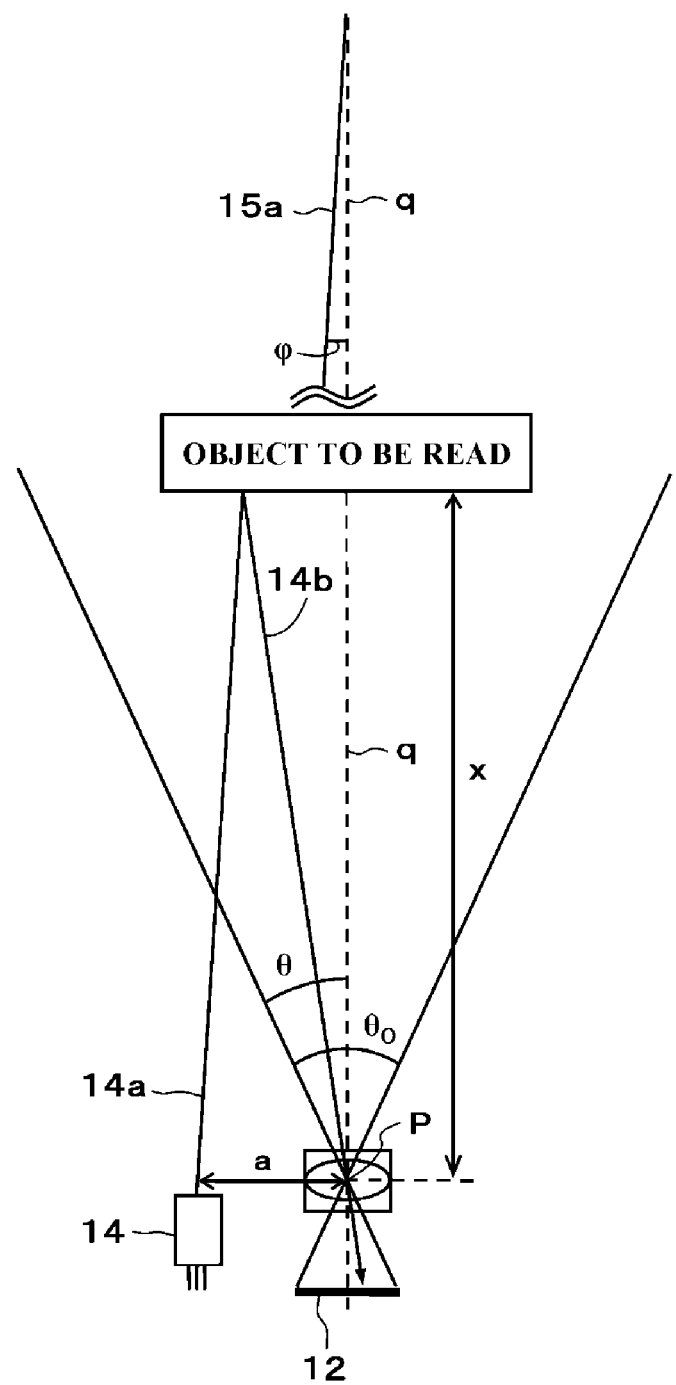
FIG. 22 is a diagram of parameters that are necessary for calculating a distance up to an object to be read.
Figure 23:
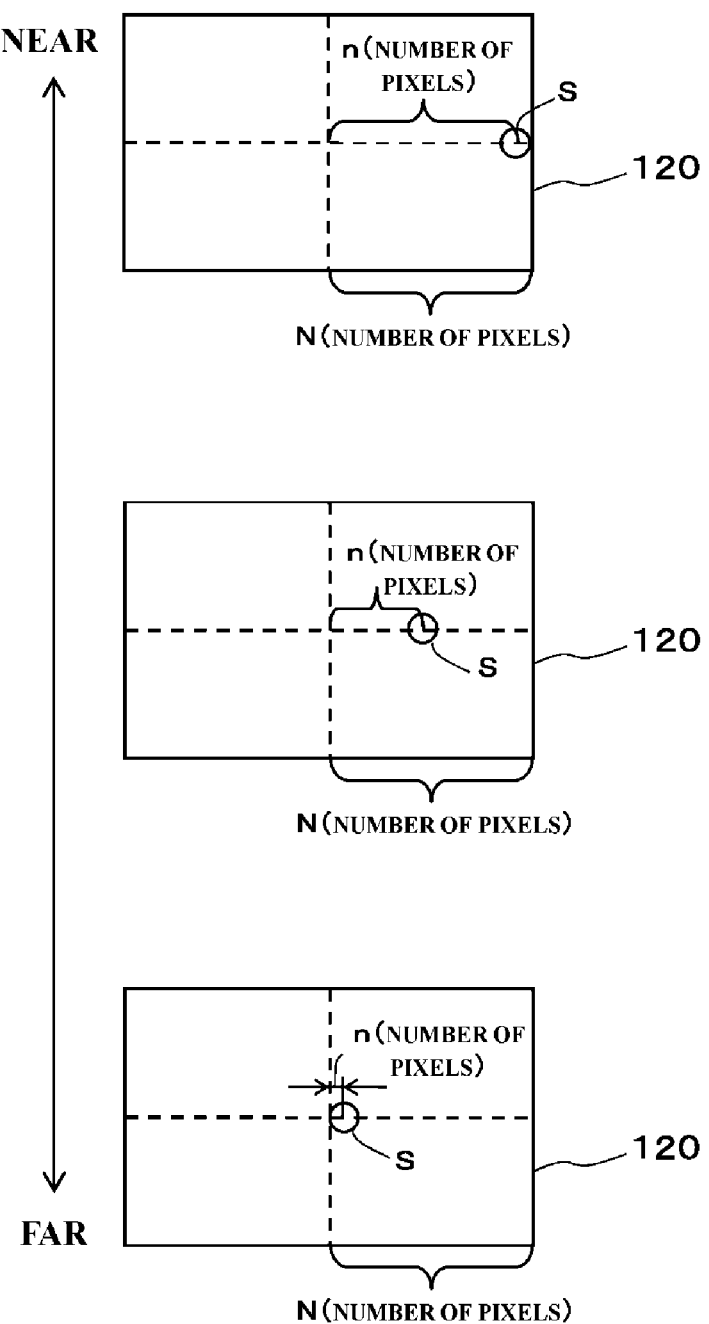
FIG. 23 is a diagram showing an example of reflected light to be reflected on an image area.

The following will describe a calculating method of a distance up to an object to be read. FIG. 22 is a diagram of parameters that are necessary for calculating the distance up to the object to be read. FIG. 23 is a diagram showing an example of the reflected light to be reflected on the image area.

The distance x up to the object to be read can be calculated on the basis of the following parameters shown in FIG. 22 and the following formula (14).

x: a distance from the principal point P in an imaging optical lens to the object to be read;

a: a distance from the principal point P in an imaging optical lens to (a center) of the laser beam 14a when the measurement is carried out along a direction which is parallel with the image area of the CMOS image sensor 12;

$\theta$: a half angle of a view angle $\theta_0$, which spreads from the principal point P in an imaging optical lens to a direction along the laser beam 14a;

N: a half of the number of pixels in the CMOS image sensor 12 when counting them along a direction from the principal point P in an imaging optical lens toward the laser beam 14a;

n: number of pixels from a center position (a position corresponding to the principal point P in an imaging optical lens) of the CMOS image sensor 12 to a center position of a spot of the reflected light 14b; and: an angle created by the laser beam 14a and an optical axis q of the imaging optical lens.

[Formula 5]

$$x = \frac{a}{\tan\theta \frac{n}{N} + \tan\phi} \quad (14)$$

It is to be noted that a laser beam 15a shown in an upper side of the object to be read in FIG. 22 is illustrated for explaining the angle.

When the reflected light of the laser beam is incident to the image area 120, as shown in FIG. 23, a spot S appears at a side of the imaged image along a horizontal axis thereof when the object to be read exists near or it appears near a center thereof when the object to be read exists far. Accordingly, the CPU 210 goes to a step SC4 where a distance from the CMOS image sensor 12 to the object to be read is calculated on the basis of a position of the spot by the reflected right in the image.

At a next step SC5, the CPU 210 searches a focus table previously stored on the ROM 220 based on the distance calculated in the step SC4 to obtain values of the focus control parameters and controls the liquid crystal lens optical body 30 based on these values of the focus control parameters to adjust the focus so as to be in focus around the distance calculated in the step SC4 by the above-mentioned autofocus operation.

At a next step SC6, the CPU 210 performs any illumination by lighting the marker LED 13 only for a period of lighting time set at the step SC6 with being synchronized with the shutter-opening timing of the CMOS image sensor 12 to image the image of the object to be read which had been detected at the step SC3, so that based on the obtained image data, it tries to decode the code symbol 100 which is estimated so as to be attached to the object to be read.

At a step SC7, it then is determined whether or not the decoding is successful. If it is successful, then data obtained by the decoding at the step SC8 is output to a predetermined external apparatus, any internal data processing means and/or the like and at a step SC9, it returns the focus to its basic condition, completes the reading thereof and goes back to the step SC1.

If the decoding fails, then it is determined whether or not a previously set period of reading available time has elapsed at the step SC10. If it has not elapsed, the CPU 210 goes back to the step SC6 where the imaging and decoding are again tried.

As any causes for the decoding to fail at the step SC7, various kinds of causes are conceivable such as a case where no code symbol is attached to the detected object to be read from beginning, a case where the code symbol 100 is out of the imaged region by the CMOS image sensor 12, and a case where the adjustment at the steps SC5 and SC6 has not appropriately been done. Since they may be improved when a period of time that is necessary for response adjusting has elapsed or the object to be read is shifted, they are retried.

If the period of reading available time has elapsed at the step SC10, it is determined that there is no hope of successful decoding normally even if it continues to do them anymore. The CPU 210 then stops the reading once, returns the focus to its basic condition at the step SC10 and goes back to the step SC1. Thus, at both cases where the decoding is successful and the reading fails, it goes back to the step SC1 where it immediately starts detection process of the next object to be read.

The present invention is available for a barcode reader and a two-dimensional code reader, and can realize autofocus in a small-scale apparatus.

DESCRIPTION OF CODES

1A: Optical-Information-Reading Apparatus;
2: Master Lens;
3: Varifocal Lens;
12: CMOS Image Sensor;
13: Marker LED;
14: Laser Beam Generator;
30: Liquid Crystal Lens Optical Body;
31A: First Liquid Crystal Lens;
31B: second Liquid Crystal Lens; and
200: Decoder.

The invention claimed is:

1. A liquid crystal lens optical body comprising:
plural liquid crystal lenses on an optical axis thereof, each liquid crystal lens including a liquid crystal layer and electrodes holding the liquid crystal layer there between and changing optical power by controlling orientation condition of liquid crystal molecules based on an input signal to the electrodes,
wherein in the plural liquid crystal lenses, a response speed when the optical power undergoes a transition from a large condition thereof to a small condition thereof, in response to the input signal, is different from a response speed when the optical power undergoes a transition from a small condition thereof to a large condition thereof, and wherein the plural liquid crystal lenses are a combination of a first liquid crystal lens and a second liquid crystal lens, the first liquid crystal lens having the response speed in which the transition from the large condition of optical power to the small condition thereof is rapid and the response speed in which the transition from the small condition of the optical power to the large condition thereof is slow, the second liquid crystal lens having the response speed in which the transition from the small condition of optical power to the large condition thereof is rapid and the response speed in which the transition from the large condition of the optical power to the small condition thereof is slow, wherein an autofocus operation to be focused is performed at a response of any of the first and second liquid crystal lenses in which a transition of the optical power is rapid in response to the input signal.

2. The liquid crystal lens optical body according to claim 1, wherein a target amount of the transition of the optical power to be set on the basis of a distance up to an object is set in a combination of the first and second liquid crystal lenses such that a period of response time becomes short at a total of the amounts of transition of the optical powers thereof.

3. The liquid crystal lens optical body according to claim 2, wherein on non-operation of the autofocus operation, with a response of any of the first and second liquid crystal lenses in which a transition of the optical power is slow, the optical powers of the first and second liquid crystal lenses are changed one for the other without changing the optical power of the combination of the first and second liquid crystal lenses.

4. The liquid crystal lens optical body according to claim 1, wherein on non-operation of the autofocus operation, with a response of any of the first and second liquid crystal lenses in which a transition of the optical power is slow, the optical powers of the first and second liquid crystal lenses are changed one for the other without changing the optical power of the combination of the first and second liquid crystal lenses.

5. An optical-information-reading apparatus comprising:
a varifocal lens that adjusts a focal position;
an imaging means that images an object focused by the varifocal lens;
a distance-measuring means that measures a distance to the object to be imaged; and
a control means that calculates the distance up to the object using the distance-measuring means, controls the varifocal lens based on calculated distance information to focus the object with the imaging means and images the object,
wherein the varifocal lens contains plural liquid crystal lenses on an optical axis thereof, each liquid crystal lens including a liquid crystal layer and electrodes holding the liquid crystal layer there between and changing optical power by controlling orientation condition of liquid crystal molecules based on an input signal to the electrodes, and
wherein in the plural liquid crystal lenses, a response speed when the optical power undergoes a transition from a large condition thereof to a small condition thereof, in response to the input signal, is different from a response speed when the optical power undergoes a transition from a small condition thereof to a large condition thereof
wherein the plural liquid crystal lenses are a combination of a first liquid crystal lens and a second liquid crystal lens, the first liquid crystal lens having the response speed in which the transition from the large condition of optical power to the small condition thereof is rapid and the response speed in which the transition from the small condition of the optical power to the large condition thereof is slow, the second liquid crystal lens having the response speed in which the transition from the small condition of optical power to the large condition thereof is rapid and the response speed in which the transition from the large condition of the optical power to the small condition thereof is slow, wherein an autofocus operation to be focused is performed at a response of any of the first and second liquid crystal lenses in which a transition of the optical power is rapid in response to the input signal.

6. The optical-information-reading apparatus according to claim 5, a target amount of the transition of the optical power to be set on the basis of a distance up to an object is set in a combination of the first and second liquid crystal lenses such that a period of response time becomes short at a total of the amounts of transition of the optical powers thereof.

7. The optical-information-reading apparatus according to claim 6, wherein on non-operation of the autofocus operation, with a response of any of the first and second liquid crystal lenses in which a transition of the optical power is slow, the optical powers of the first and second liquid crystal lenses are changed one for the other without changing the optical power of the combination of the first and second liquid crystal lenses.

8. The optical-information-reading apparatus according to claim 5, wherein on non-operation of the autofocus operation, with a response of any of the first and second liquid crystal lenses in which a transition of the optical power is slow, the optical powers of the first and second liquid crystal lenses are changed one for the other without changing the optical power of the combination of the first and second liquid crystal lenses.

* * * * *